US011545116B2

(12) United States Patent
Nishida et al.

(10) Patent No.: US 11,545,116 B2
(45) Date of Patent: Jan. 3, 2023

(54) SHIP INFORMATION DISPLAY DEVICE AND METHOD OF DISPLAYING SHIP INFORMATION

(71) Applicant: Furuno Electric Co., Ltd., Nishinomiya (JP)

(72) Inventors: Keita Nishida, Nishinomiya (JP); Hiroshi Yoshii, Nishinomiya (JP); Tatsuya Asahara, Nishinomiya (JP); Kristian Ari Prasetyo, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 16/170,906

(22) Filed: Oct. 25, 2018

(65) Prior Publication Data
US 2019/0130876 A1    May 2, 2019

(30) Foreign Application Priority Data

Oct. 27, 2017    (JP) .............................. JP2017-207739

(51) Int. Cl.
*G09G 5/377* (2006.01)
*G01S 7/62* (2006.01)
(Continued)

(52) U.S. Cl.
CPC .............. *G09G 5/377* (2013.01); *G01S 7/62* (2013.01); *G01S 7/6263* (2013.01);
(Continued)

(58) Field of Classification Search
CPC .................................................... G06T 19/006
See application file for complete search history.

(56) References Cited

U.S. PATENT DOCUMENTS 9,500,485 B2    11/2016  Miichi et al.
2009/0271054 A1*  10/2009  Dokken ................ G01S 13/937
701/21
(Continued)

FOREIGN PATENT DOCUMENTS

JP    S55109975 A    8/1980
JP    H05143055 A    6/1993
(Continued)

OTHER PUBLICATIONS

Han, Jun, Akira Asada, and Yasunobu Yagita. "New USB-based 3D digital echo sounder system for mapping and assessing fish and aquatic plants." Fisheries science 73.4 (2007): 770-776. (Year: 2007).*

*Primary Examiner* — Diane M Wills
(74) *Attorney, Agent, or Firm* — Alleman Hall Creasman & Tuttle LLP

(57) ABSTRACT

A ship information display device is provided, which may include a first processor, a second processor, a graphic processor, and a display. The first processor may generate a first image based on first ship information received from a first ship sensor and generate a screen to be synthesized including the first image and a blank image. The second processor may generate a second image based on second ship information received from a second ship sensor. The graphic processor may generate a synthesized screen including the first image and the second image by replacing the blank image of the screen to be synthesized by the second image generated by the second processor. The display may display the synthesized screen.

27 Claims, 30 Drawing Sheets

(51) Int. Cl.
*G06F 3/147* (2006.01)
*G01S 7/06* (2006.01)
*G09G 5/02* (2006.01)
*G09G 5/14* (2006.01)

(52) U.S. Cl.
CPC .......... *G01S 7/6272* (2013.01); *G01S 7/6281* (2013.01); *G06F 3/147* (2013.01); *G01S 7/06* (2013.01); *G09G 5/026* (2013.01); *G09G 5/14* (2013.01); *G09G 2340/04* (2013.01); *G09G 2340/12* (2013.01); *G09G 2354/00* (2013.01); *G09G 2360/06* (2013.01); *G09G 2360/08* (2013.01); *G09G 2370/20* (2013.01); *G09G 2380/12* (2013.01)

(56) References Cited

U.S. PATENT DOCUMENTS

| | | | | |
|---|---|---|---|---|
| 2012/0262492 A1* | 10/2012 | Ohashi | ............... | G01C 21/3664 345/660 |
| 2013/0083025 A1* | 4/2013 | Gibson | ................ | G06F 3/1438 345/428 |
| 2013/0148947 A1* | 6/2013 | Glen | ...................... | H04N 5/917 386/355 |
| 2013/0272093 A1* | 10/2013 | Chen | ....................... | G01S 15/89 367/88 |
| 2015/0025718 A1* | 1/2015 | Miichi | ............... | G06F 3/04845 701/21 |
| 2015/0078123 A1* | 3/2015 | Batcheller | ............... | G01S 15/86 367/7 |
| 2016/0078664 A1* | 3/2016 | Mizuguchi | ............... | G09G 5/12 345/475 |
| 2016/0123739 A1* | 5/2016 | Okuda | ................... | G01C 21/20 701/537 |
| 2017/0016989 A1* | 1/2017 | Smith | .................... | G01S 15/96 |
| 2017/0039744 A1* | 2/2017 | Steward | ................. | G06T 11/60 |

FOREIGN PATENT DOCUMENTS

| | | |
|---|---|---|
| JP | H05223934 A | 9/1993 |
| JP | H09171434 A | 6/1997 |
| JP | 2001272248 A | 10/2001 |
| JP | 2010026297 A | 2/2010 |
| JP | 2017117020 A | 6/2017 |
| WO | 2013121458 A1 | 8/2013 |

* cited by examiner

SHIP INFORMATION DISPLAY DEVICE AND METHOD OF DISPLAYING SHIP INFORMATION

CROSS-REFERENCE TO RELATED APPLICATION(S)

This application claims priority under 35 U.S.C. § 119 to Japanese Patent Application No. 2017-207739, which was filed on Oct. 27, 2017, the entire disclosure of which is hereby incorporated by reference.

TECHNICAL FIELD

The present disclosure relates to a ship information display device and a method of displaying ship information, which display the ship information, such as a nautical chart, radar information, echo information of a fish finder, and meter information of a ship.

BACKGROUND

Devices are known which are mounted to a ship and display, as information related to the ship, ship information, such as a nautical chart including route information of the ship, radar image around the ship obtained from a radar device, an echo image obtained from a fish finder, and meter information, such as a ship speed and an engine speed. WO2013/121458A1 discloses an information display device of which a controller generates images of various kinds of ship information based on the information received from various ship instruments, and simultaneously displays the images in a plurality of areas of a screen, respectively.

In recent years, the amount of information which the information display device for the ship handles has been increasing. For example, since a three-dimensional (3D) echo image which is obtained by three-dimensionally drawing ocean bed topography and positions of detected schools of fish is generated based on the echo information directly below the ship obtained from the fish finder, the 3D image has a remarkably larger amount of information used for the generation compared with the conventional two-dimensional (2D) image. In addition, since a higher information processing capability is needed for the image generation using such a large amount of information, there is a problem that the throughput of the controller might be insufficient when the images are displayed simultaneously with other ship information.

SUMMARY

The present disclosure is made in view of the situation described above, and one purpose thereof is to provide a ship information display device and a method of displaying ship information which can solve the problem described above.

According to one aspect of the present disclosure, a ship information display device is provided, which may include a first processor, a second processor, a graphic processor, and a display. The first processor may generate a first image based on first ship information received from a first ship sensor and generate a first screen to be synthesized including the first image and a blank image. The second processor may generate a second image based on second ship information received from a second ship sensor. The graphic processor may generate a synthesized screen including the first image and the second image by replacing the blank image of the first screen to be synthesized by the second image generated by the second processor. The display may display the synthesized screen.

According to another aspect of the present disclosure, a method of displaying ship information is provided, which may include the steps of generating a first image based on first ship information received from a first ship sensor and generating a screen to be synthesized including the first image and a blank image, generating a second image based on second ship information received from a second ship sensor, generating a synthesized screen including the first image and the second image by replacing the blank image of the first screen to be synthesized by the second image, and displaying the synthesized screen.

According to the present disclosure, a plurality kind of ship information may be simultaneously displayed while reducing load to the processors.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Hereinafter, one embodiment of the present disclosure is described with reference to the accompanying drawings. Note that each embodiment described below illustrates a method and device for implementing technical ideas of the present disclosure, and the technical ideas of the present disclosure are not limited to the following arts. Various changes may be added to the technical ideas of the present disclosure without departing from the technical scope defined in the claims. Note that the present disclosure may be applied to ships which typically travel on water or sea and may be referred to as surface ships, and may also be applied to other types of ships, which may include boats, dinghies, watercraft, and vessels. Further, the present disclosure may also be applied, if applicable, to submarines, aircrafts, and spaceships, as well as any types of vehicles which travel on the ground, such as automobiles, motorcycles, and ATVs.

<Configuration of Ship Information Display Device>

Figure 1:
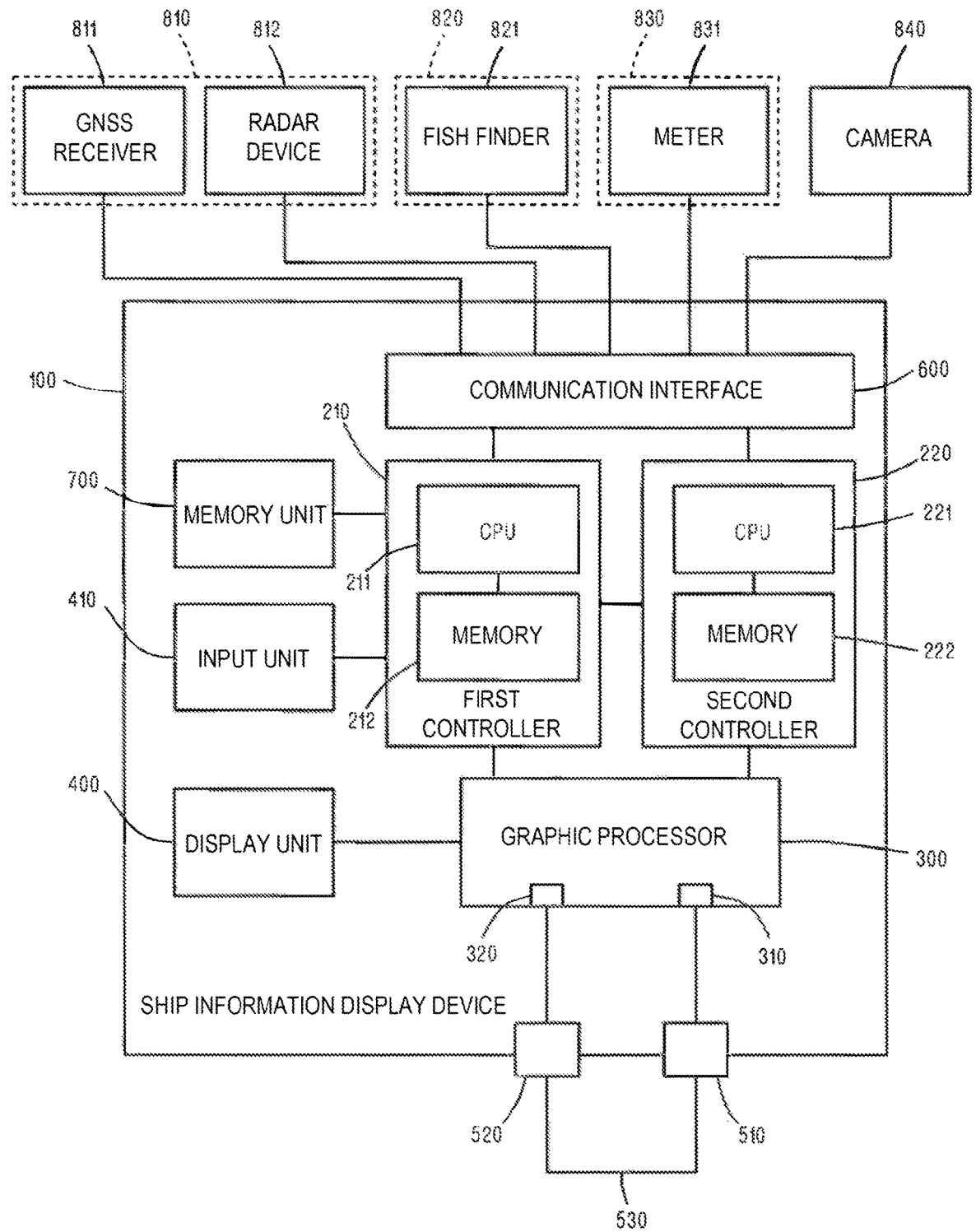
FIG. 1 is a block diagram illustrating a configuration of a ship information display device according to one embodiment.
Figure 2:
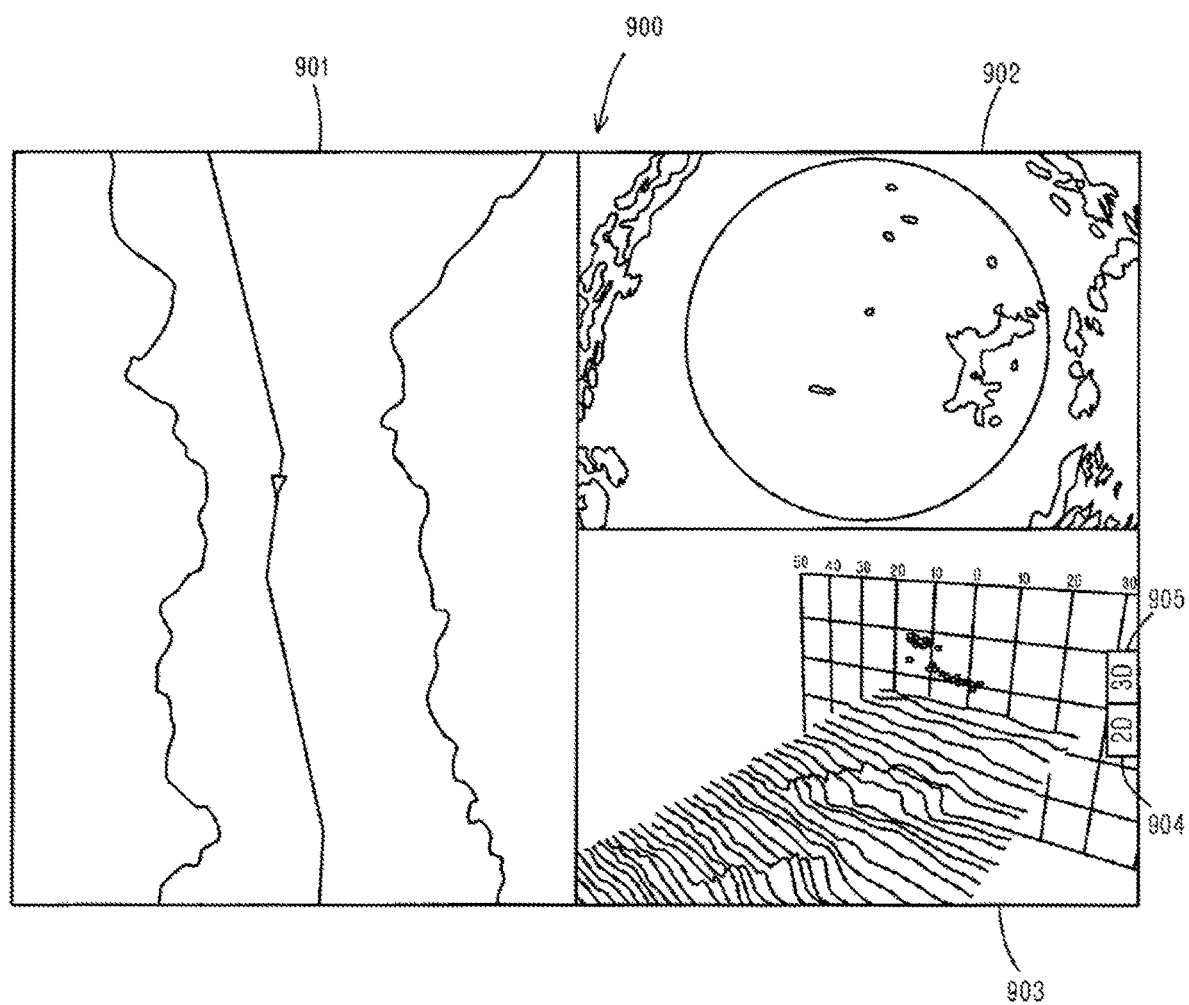
FIG. 2 is a view illustrating one example of a synthesized screen of the ship information display device according to the embodiment.

FIG. 1 is a block diagram illustrating a configuration of a ship information display device 100 according to one embodiment. The ship information display device 100 may be a plotter which displays route information of a ship, and may be installed in a bridge of the ship. The ship information display device 100 may be connected with instruments, such as a GNSS (Global Navigation Satellite System) receiver 811, a radar device 812, a fish finder 821, various meters 831, a camera 840, and can display a synthesized screen where the route information and other information collected from the instruments described above are integrated. FIG. 2 is a view illustrating one example of the synthesized screen. The synthesized screen 900 of this example may include a display area 901 for a nautical chart plotter image, a display area 902 for a radar image, and a display area 903 for an underwater echo image obtained from the fish finder 821. In the nautical chart plotter image displayed in the display area 901, the position and route of the ship may be indicated on the nautical chart. In the radar image displayed in the display area 902, a distance and a direction from the ship of objects, such as other ships around the ship, buoys, and birds, which are detected by the radar device 812, may be indicated. In the underwater echo image displayed in the display area 903, the position and ocean bed topography of schools of fish which are detected below the ship may be indicated.

Referring back to FIG. 1, the ship information display device 100 may include a first controller (processor) 210, a second controller (processor) 220, a graphic processor 300, a display unit 400, an input unit 410, an external output terminal 510, an external input terminal 520, a communication interface 600, and a memory unit 700.

The first controller 210 and the second controller 220 may be CPU modules having CPUs 211 and 221 and memories 212 and 222, respectively. Computer program stored in a ROM or a flash memory (not illustrated) may be loaded to each of the memories 212 and 222, and information processing (described later) may be achieved by the CPUs 211 and 221 executing the computer program.

The first controller 210 and the second controller 220 may be communicatively connected with each other via a serial bus etc. so that they can transmit and receive data therebetween. The first controller 210 and the second controller 220 may be communicatively connected with the graphic processor 300 so that image data generated by the respective controllers can be transmitted to the graphic processor 300.

The graphic processor 300 may be an integrated circuit, such as ASIC (Application Specific Integrated Circuit) and FPGA (Field Programmable Gate Array), and process images given from the first controller 210 and the second controller 220. The graphic processor 300 may be connected to the display unit 400, and output image signals to the display unit 400.

The display unit 400 may be a display device, such as a liquid crystal display and an organic electroluminescence (EL), and display a screen according to the inputted image signals. The input unit 410 may be a position input device, such as a transparent pressure-sensitive or capacitance touchpad. The input unit 410 may have about the same size and shape as the display unit 400, and may be adhered to the surface of the display unit 400. Thus, the display unit 400 and the input unit 410 may be configured as an integrated touch panel. The input unit 410 may be connected to the first controller 210 so that inputted information of the input unit 410 is given to the first controller 210. Note that a position input device other than the touchpad may also be used. For example, it is also possible to use an input-and-output (I/O) interface, such as a USB, as the input unit 410 so that the information is inputted from a mouse connected to the input unit 410.

Figure 3:
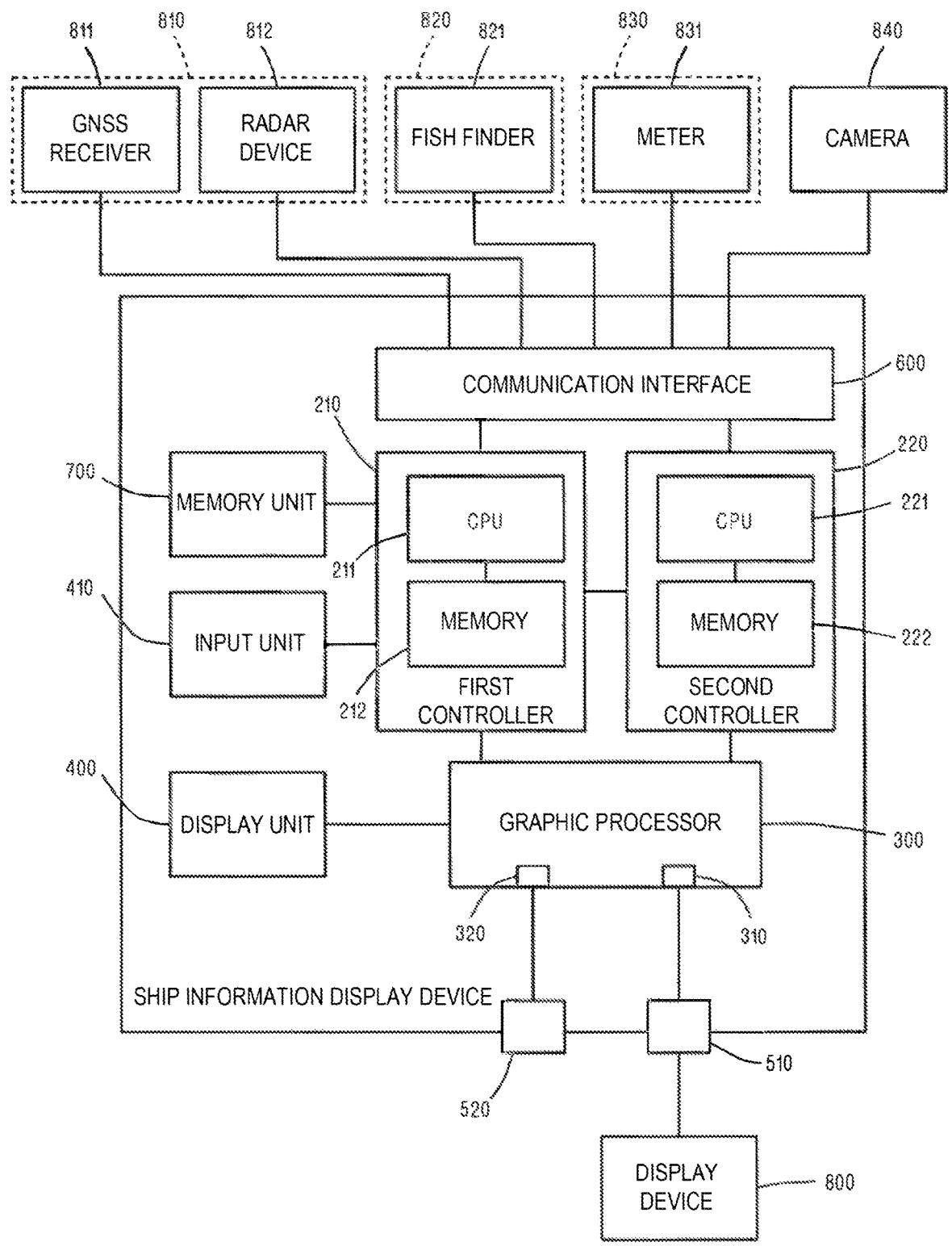
FIG. 3 is a block diagram illustrating the ship information display device according to the embodiment which is connected with an external display device.

The graphic processor 300 may be provided with an output terminal 310 and an input terminal 320 for the image signals. The output terminal 310 may be connected to the external output terminal 510, and the input terminal 320 may be connected to the external input terminal 520. The external output terminal 510 may output the image signal transmitted from the graphic processor 300 to a device outside the ship information display device 100. The external output terminal 510 is connectable with an external display device. FIG. 3 is a block diagram illustrating the ship information display device 100 according to this embodiment which is connected with the external display device. By connecting the external output terminal 510 to a display device 800, the image signal can be given to the display device 800 and a screen can be displayed.

The external input terminal 520 may receive the image signal input from the outside, and give the image signal to the graphic processor 300. The external input terminal 520 is possible to connect to an external image device (not illustrated) so that the image signal is inputted into the ship information display device 100 from the image device.

As illustrated in FIG. 1, the external output terminal 510 and the external input terminal 520 can be connected with each other via a cable 530 for the image signals. In this case, the image signal outputted from the external output terminal 510 may be inputted into the external input terminal 520.

The communication interface 600 can be connected to external ship sensors so that various kinds of information related to the ship (hereinafter, referred to as "the ship information") are received from the connected ship sensors. For example, the communication interface 600 may be connected to the GNSS receiver 811, such as a GPS (Global Positioning System) receiver, the radar device 812 which emits an electric wave around the ship and receives a corresponding reflection wave to acquire radar information, the fish finder 821 which emits an ultrasonic signal directly below the ship and receives a corresponding reflection wave to acquire echo information, and the meter 831 which measures a ship speed, an engine speed, a temperature, etc. In this embodiment, the GNSS receiver 811 and the radar device 812 may correspond to a first ship sensor 810, the fish finder 821 may correspond to a second ship sensor 820, and the meter 831 may correspond to a third ship sensor 830. The communication interface 600 may be connected to the camera 840 installed, for example, inside the ship.

The communication interface 600 may be connected to the first controller 210 and the second controller 220, respectively so that information (first ship information, second ship information, and third ship information) can be received from the first ship sensor 810, the second ship sensor 820, and the third ship sensor 830, respectively, and the received information can be transmitted selectively to the first controller 210 and the second controller 220. The communication interface 600 can also transmit the image signal received from the camera 840 selectively to the first controller 210 and the second controller 220.

The memory unit 700 may be an external storage device, such as a hard disk drive, and may be connected to the first controller 210. The memory unit 700 may store nautical chart data.

<Operation of Ship Information Display Device>

Next, operation related to a synthesized screen display of the ship information display device 100 according to this embodiment is described.

[Synthesized Screen Display Processing]

Figure 4:
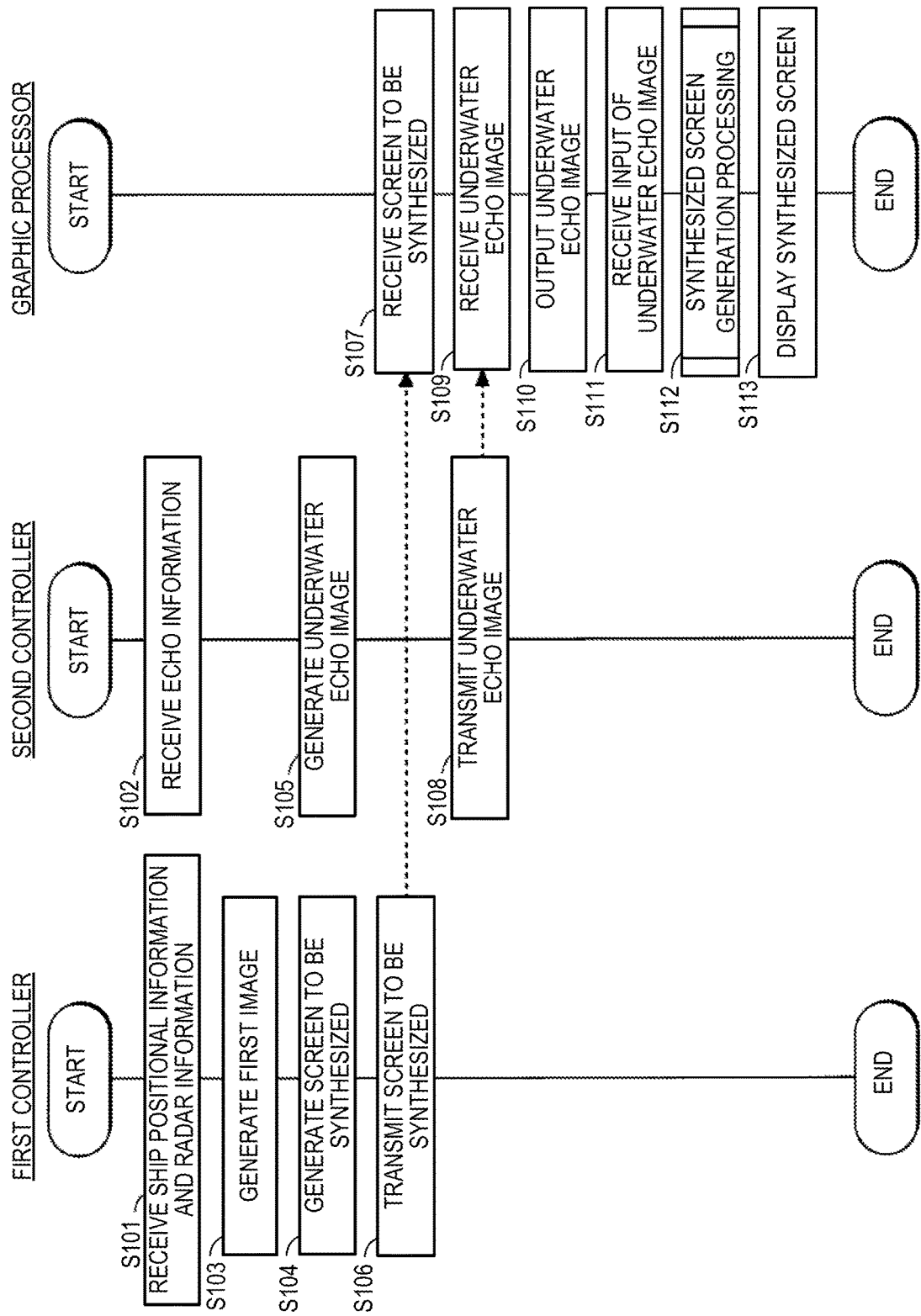
FIG. 4 is a flowchart illustrating synthesized screen display processing executed by the ship information display device according to the embodiment.

FIG. 4 is a flowchart illustrating synthesized screen display processing executed by the ship information display device 100 according to this embodiment. When a display screen immediately after a boot-up is set as a synthesized screen, the ship information display device 100 may execute the synthesized screen display processing immediately after the boot-up. In a case where a screen other than the synthesized screen is displayed, the ship information display device 100 may also execute the synthesized screen display processing when a display instruction of the synthesized screen is given to the input unit 410 from a user. The synthesized screen display processing may be executed in a state where the external output terminal 510 and the external input terminal 520 are connected through the cable 530 (see FIG. 1).

From the GNSS receiver 811, the radar device 812, and the fish finder 821, the positional information of the ship (ship positional information), the radar information, and the echo information may be continuously transmitted at a given time interval, respectively. In the synthesized screen display processing, first, the first controller 210 may receive the ship positional information and the radar information which are the first ship information (Step S101), and the second controller 220 may receive the echo information which is the second ship information (Step S102).

Figure 5:
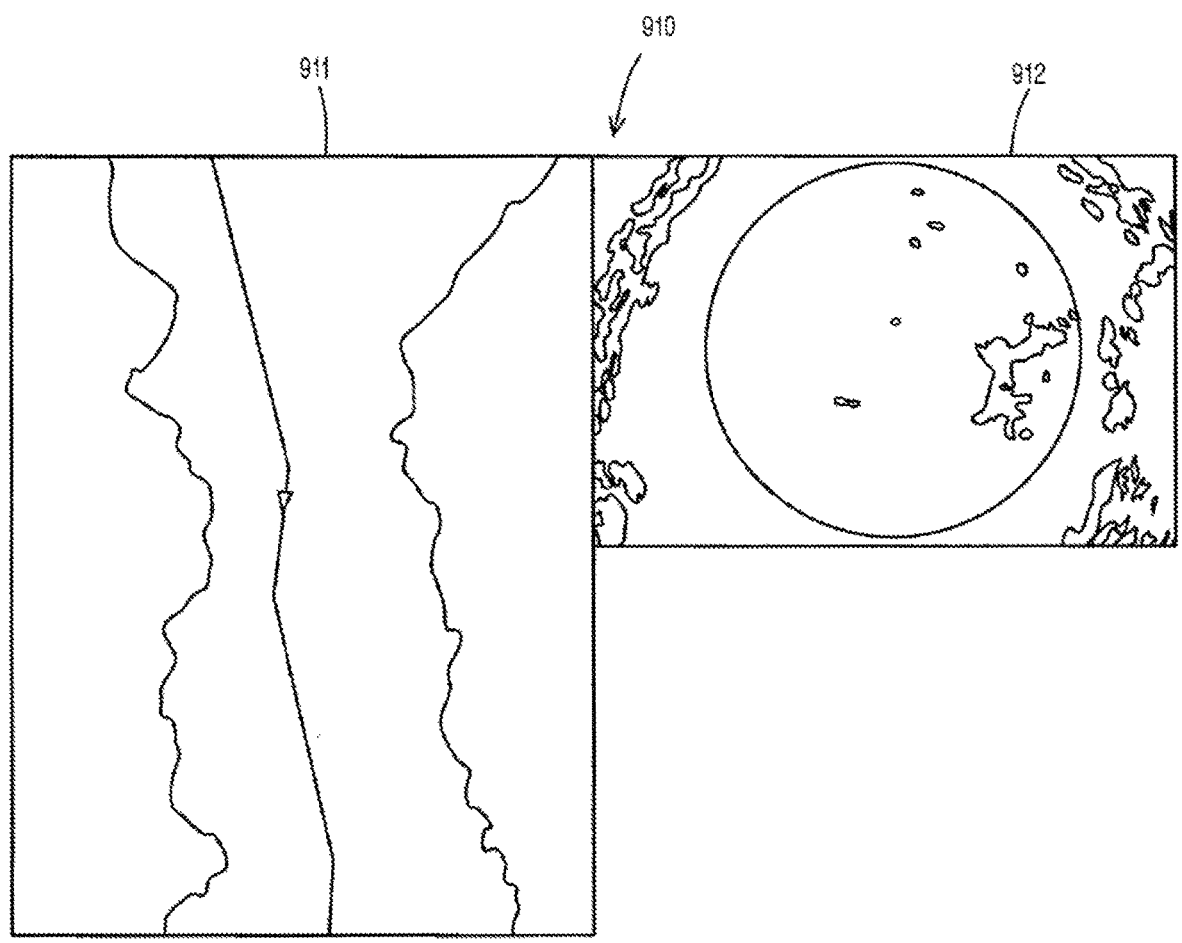
FIG. 5 is a view illustrating one example of a first image.

Next, the first controller 210 may read the nautical chart around the ship from the memory unit 700, and generate a first image including the nautical chart plotter image and the radar image (Step S103). FIG. 5 is a view illustrating one example of the first image. The first image 910 of this example may include a nautical chart plotter image 911 having a vertically elongated rectangular shape and a radar image 912 having a laterally elongated rectangular shape. The radar image 912 may have the same lateral length as the nautical chart plotter image 911, and have one half of the vertical length of the nautical chart plotter image 911. In the first image 910, the nautical chart plotter image 911 may be located on the left side, and the radar image 912 may be located on the right side, while their upper ends are aligned. That is, there may be no image in a part of the first image 910, on the lower right side of the nautical chart plotter image 911 and below the radar image 912.

Figure 6:
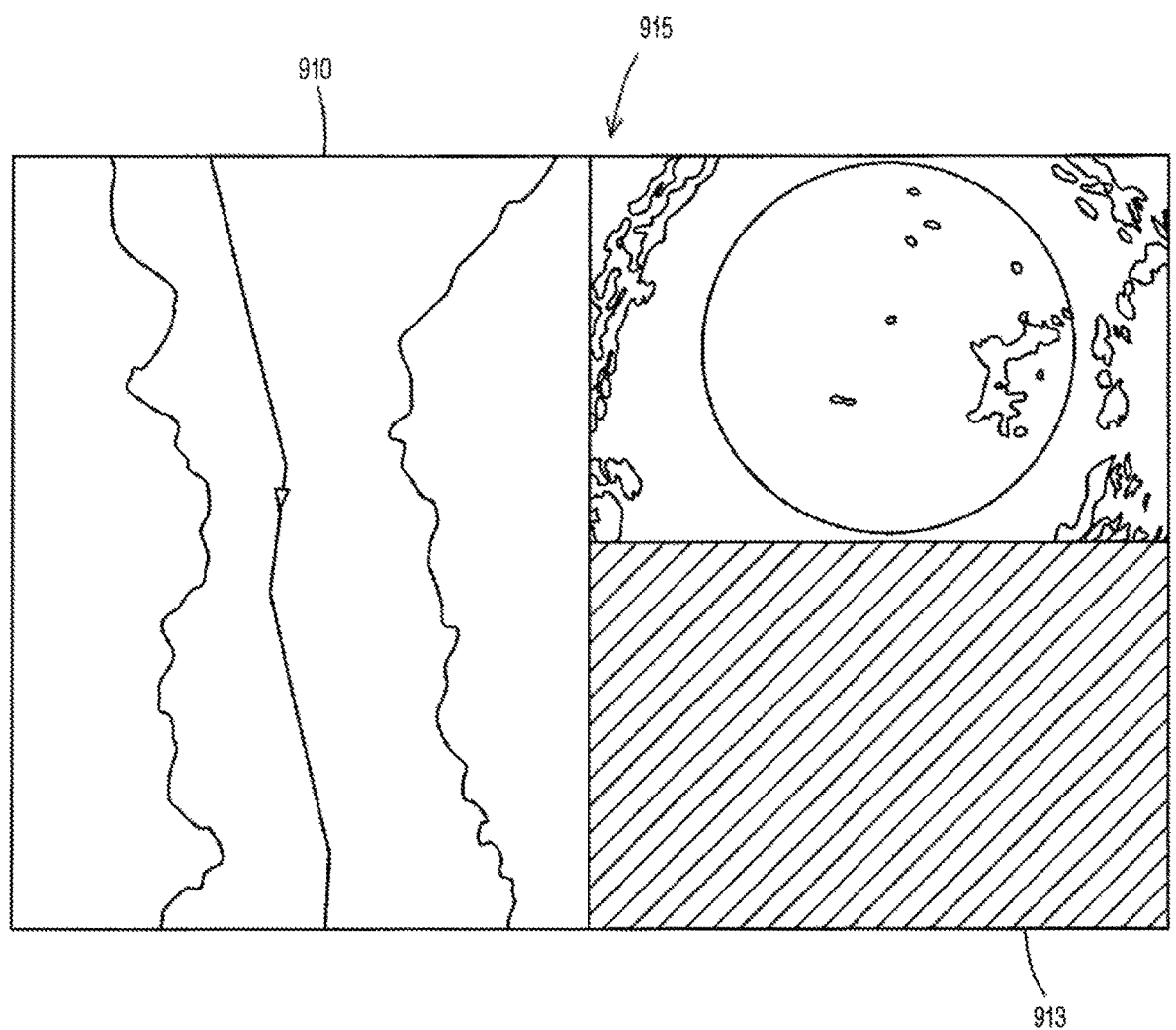
FIG. 6 is a view illustrating one example of a screen to be synthesized.

Again referring to FIG. 4, the first controller 210 may then generate a screen to be synthesized (Step S104). FIG. 6 is a view illustrating one example of the screen to be synthesized. The screen to be synthesized 915 may be an image of, for example, 1280×720 pixels in the lateral directions and vertical directions, and include the first image 910 and a blank image 913 on the lower right side of the first image 910. That is, the screen to be synthesized may be an image of the rectangular shape where the blank portion located at the lower right of the first image 910 is the blank image 913. All the pixels of the blank image 913 may be set to a given color (e.g., black). Hereinafter, this color may be referred to as "transparent color."

Figure 7:
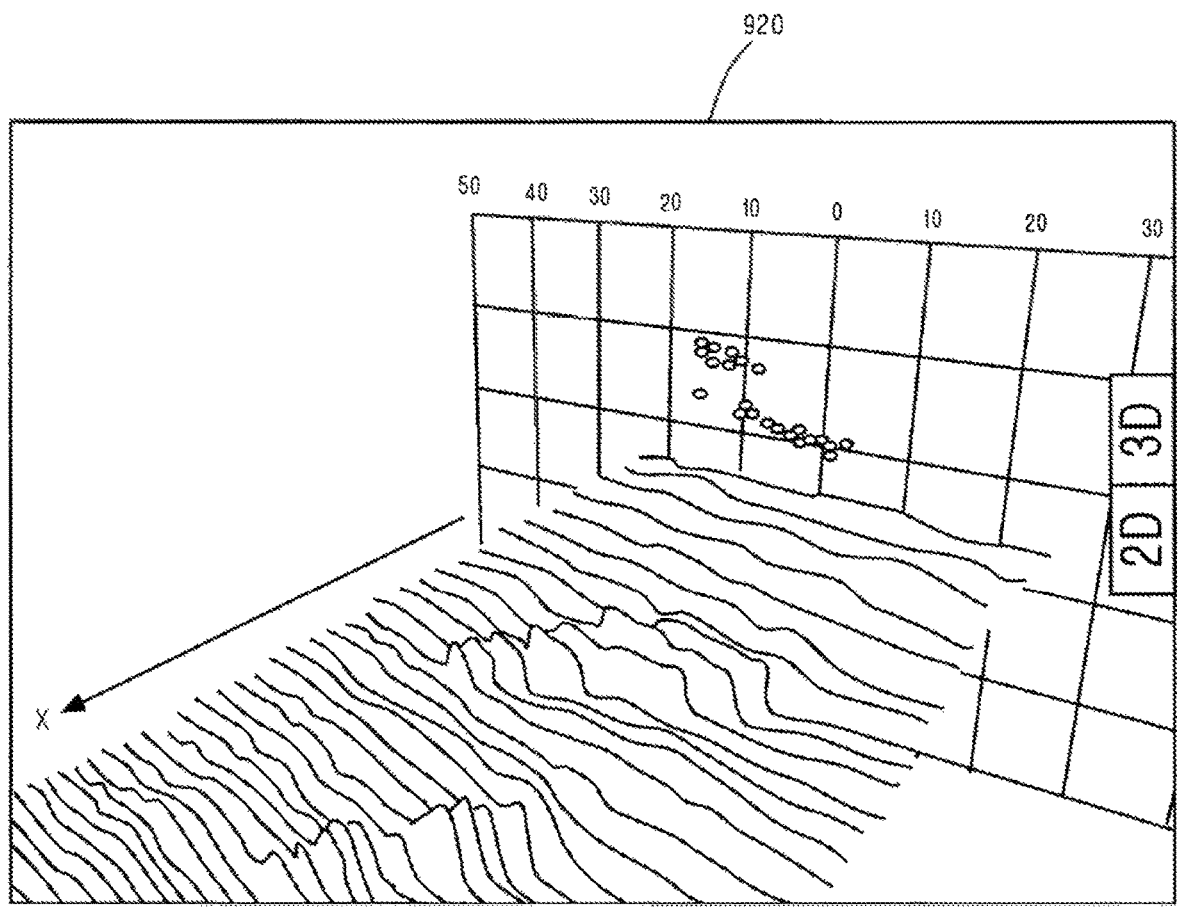
FIG. 7 is a view illustrating one example of a three-dimensional underwater echo image.

Again referring to FIG. 4, the second controller 220 may generate the underwater echo image which is the second image based on the received echo information (Step S105). FIG. 7 is a view illustrating one example of the underwater echo image. The underwater echo image of this example may be a 3D underwater echo image 920 of, for example, 1280×720 pixels in the lateral directions and vertical directions. The echo information may be generated continuously in time, and one 2D echo tomogram may be generated from the echo information at one time point. The 3D underwater echo image 920 may be drawn by arranging a plurality of echo tomograms in one row in X-direction. Each position in the X-direction in the 3D underwater echo image 920 may correspond to time. Positions on the downstream side in the X-direction may correspond to older time (left side in the figure), and positions on the upstream side may correspond to newer time (right side in the figure). When the latest echo tomogram is generated, this echo tomogram may be drawn at the uppermost stream side in the X-direction, and the past echo tomograms may be then shifted by one position to the downstream side in the X-direction, respectively. Thus, the echo tomograms may be accumulated to form the 3D underwater echo image 920. As described above, the generation processing of the 3D underwater echo image 920 may be executed by the second controller 220. Although the second controller 220 has an information processing capability to execute the generation processing of the 3D underwater echo image 920 on real time, this processing may be large in computational complexity. Therefore, if the second controller 220 executes other processings at the same time, it may not be able to generate the 3D underwater echo image 920 on real time. For this reason, the first controller 210 may play a role of generation of the underwater echo image, i.e., images other than the second image. Accordingly, the load in the generation of the images required for the generation of the synthesized screen 900 may be distributed to the first controller 210 and the second controller 220, thereby reducing each load to the first controller 210 and the second controller 220.

Again referring to FIG. 4, the first controller 210 may transmit the screen to be synthesized which is generated as described above to the graphic processor 300 as the image signal (Step S106), and the graphic processor 300 may then receive the screen (Step S107). On the other hand, the second controller 220 may transmit the generated underwater echo image to the graphic processor 300 as the image signal (Step S108), and the graphic processor 300 may then receive the image (Step S109). The processings of the first controller 210 and the second controller 220 may be ended after the transmission of the image signal.

The graphic processor 300 may output from the output terminal 310 the image signal of the underwater echo image received from the second controller 220 (Step S110). The outputted image signal may be then outputted to the exterior from the external output terminal 510, and may be then inputted from the external input terminal 520 through the cable 530. This image signal may be transmitted to the input terminal 320 from the external input terminal 520 and may be then inputted into the graphic processor 300 (Step S111). When the graphic processor 300 receives the image signal of the underwater echo image, it may execute synthesized screen generation processing (Step S112).

Figure 8:
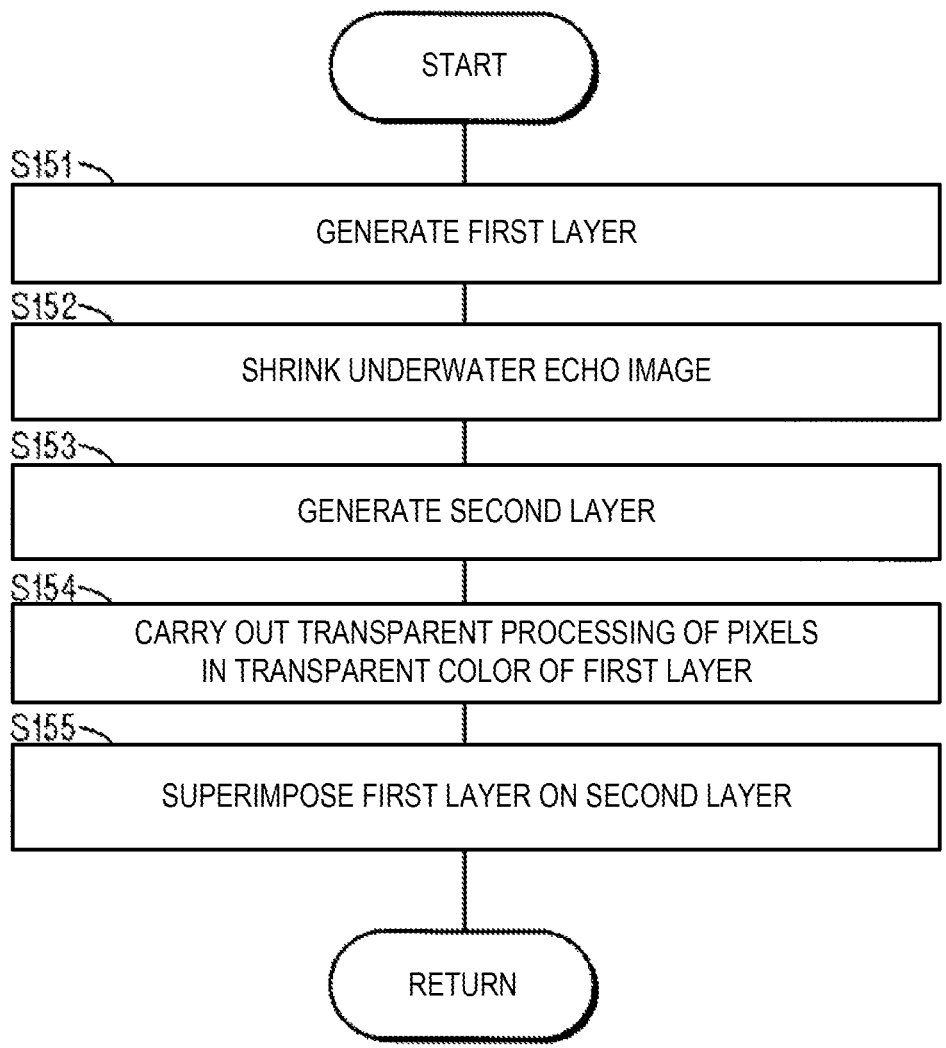
FIG. 8 is a flowchart illustrating synthesized screen generation processing.
Figure 9:
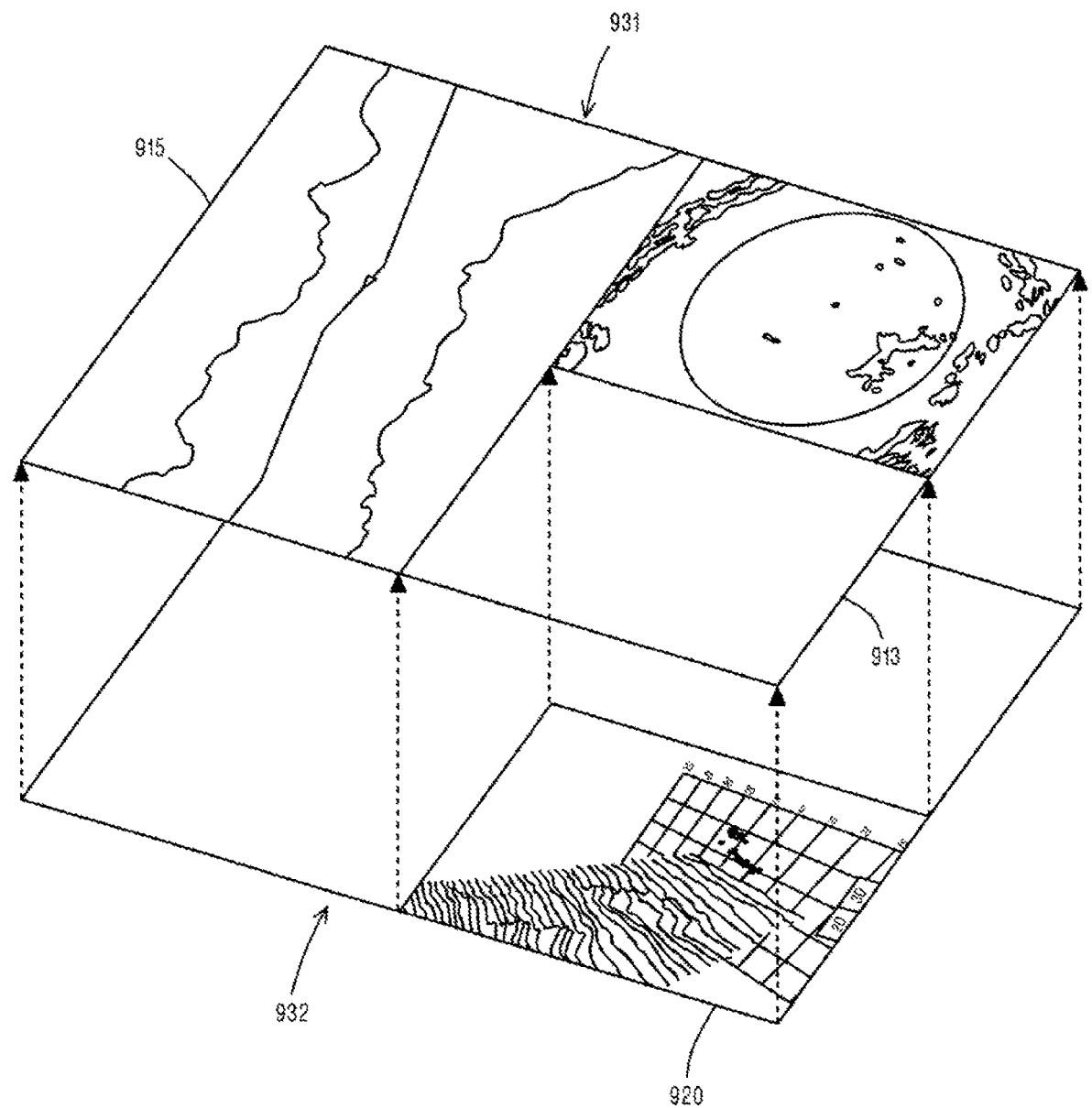
FIG. 9 is a schematic view illustrating the synthesized screen generation processing.

Below, the synthesized screen generation processing is described in detail. FIG. 8 is a flowchart illustrating the synthesized screen generation processing, and FIG. 9 is a schematic view illustrating the outline of the synthesized screen generation processing. In the synthesized screen generation processing, the graphic processor 300 may generate a first layer 931 including the screen to be synthesized 915 (Step S151). Next, the graphic processor 300 may shrink the underwater echo image 920 to the same size (640×360) as the blank image 913 (Step S152), and generate a second layer 932 including the shrunk underwater echo image 920 (Step S153). The graphic processor 300 may then carry out transparent processing of the pixels in the transparent color of the first layer 931 (Step S154). Thus, the blank image 913 may be processed to be transparent. Next, the graphic processor 300 may superimpose (overlap) the first layer 931 (surface side) on (with) the second layer 932 (background side) so that the positions of the blank image 913 and the underwater echo image 920 coincide with each other (Step S155). Thus, the underwater echo image 920 may appear through the blank image 913. In other words, the blank image 913 may be replaced by the underwater echo image 920. In this way, the screen to be synthesized 915 and the underwater echo image 920 may be synthesized to generate the synthesized screen 900.

Again referring to FIG. 4, when the synthesized screen generation processing is finished, the graphic processor 300 may output the image signal of the generated synthesized screen 900 to the display unit 400 and display the synthesized screen 900 on the display unit 400 (Step S113). As above, the synthesized screen display processing may be finished. The ship information display device 100 may repeatedly execute the synthesized screen display processing at a given time interval to perform a real-time update of the synthesized screen 900.

The synthesized screen display processing may be executed in a state where the external output terminal 510 and the external input terminal 520 are connected to each other through the cable 530 (see FIG. 1). On the other hand, in a state where the external display device 800 is connected to the external output terminal 510 (see FIG. 3), the second image, i.e., the underwater echo image 920 generated from the echo information by the fish finder 821 may be displayed by the display device 800, and meter images including the meter information, such as the ship speed, the engine speed, and the temperature, which are obtained by the nautical chart plotter image 911, the radar image 912, and the meter 831, respectively, may be displayed on the display unit 400. Note that, also in the state where the display device 800 is connected to the external output terminal 510, the ship information display device 100 may execute the synthesized screen display processing, and the synthesized screen 900 including the underwater echo image 920 may be displayed on the display unit 400. In such a case, the image signal of the underwater echo image 920 may be outputted from the external output terminal 510 while the display unit 400 is displaying the synthesized screen 900, and the external display device 800 may display the underwater echo image 920.

[Display-Mode Switch Processing]

Figure 10:
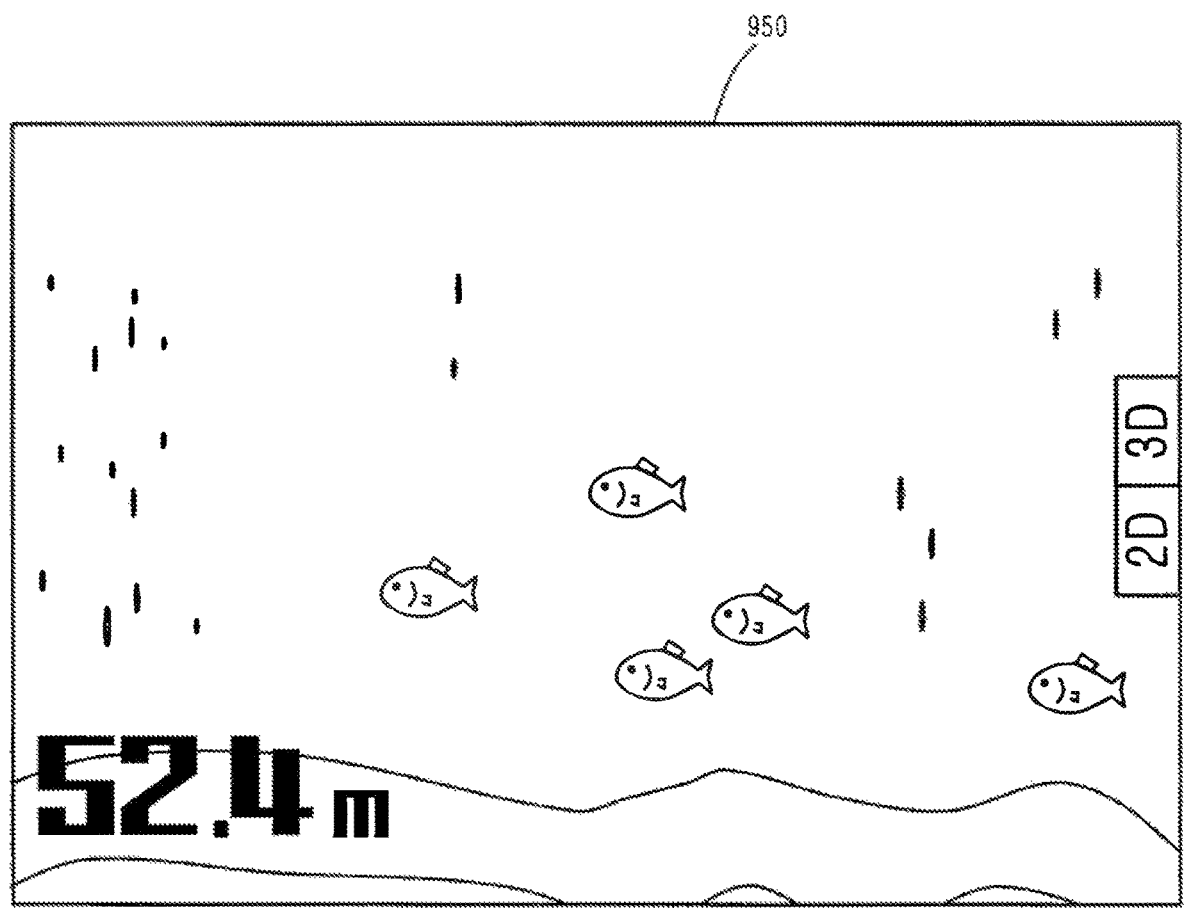
FIG. 10 is a view illustrating a two-dimensional underwater echo image.

In the ship information display device 100, a plurality of kinds of underwater echo images obtained by the fish finder 821 can be displayed. In this embodiment, a configuration which displays a two-dimensional (2D) underwater echo image directly below the ship, in addition to the 3D underwater echo image, is described. FIG. 10 is a view illustrating the 2D underwater echo image. In the 2D underwater echo image 950, the positions of schools of fish detected directly below the ship hull and the ocean bed topography may be drawn two-dimensionally.

The ship information display device 100 can execute display-mode switch processing which switches the display mode between a three-dimensional (3D) mode in which the synthesized screen including the 3D underwater echo image is displayed and a 2D mode in which the synthesized screen including the 2D underwater echo image is displayed. As illustrated in FIG. 2, two mode switch tabs 904 and 905 may be provided at the right end of the display area 903 of the synthesized screen 900. The mode switch tab 904 may be a tab for switching the mode to the 2D mode, and when an operation in which the position of the mode switch tab 904 is touched in the 3D mode by a finger is performed (hereinafter, referred to as "the tap"), the mode may be switched to the 2D mode. On the other hand, the mode switch tab 905 may be a tab for switching the mode to the 3D mode, and when the mode switch tab 905 is tapped in the 2D mode, the mode may be switched to the 3D mode. Note that the mode switch tab 904 is disabled or made inoperable in the 2D mode, while the mode switch tab 905 is disables or made inoperable in the 3D mode. In the following description, processing when switching from the 3D mode to the 2D mode is described.

Figure 11:
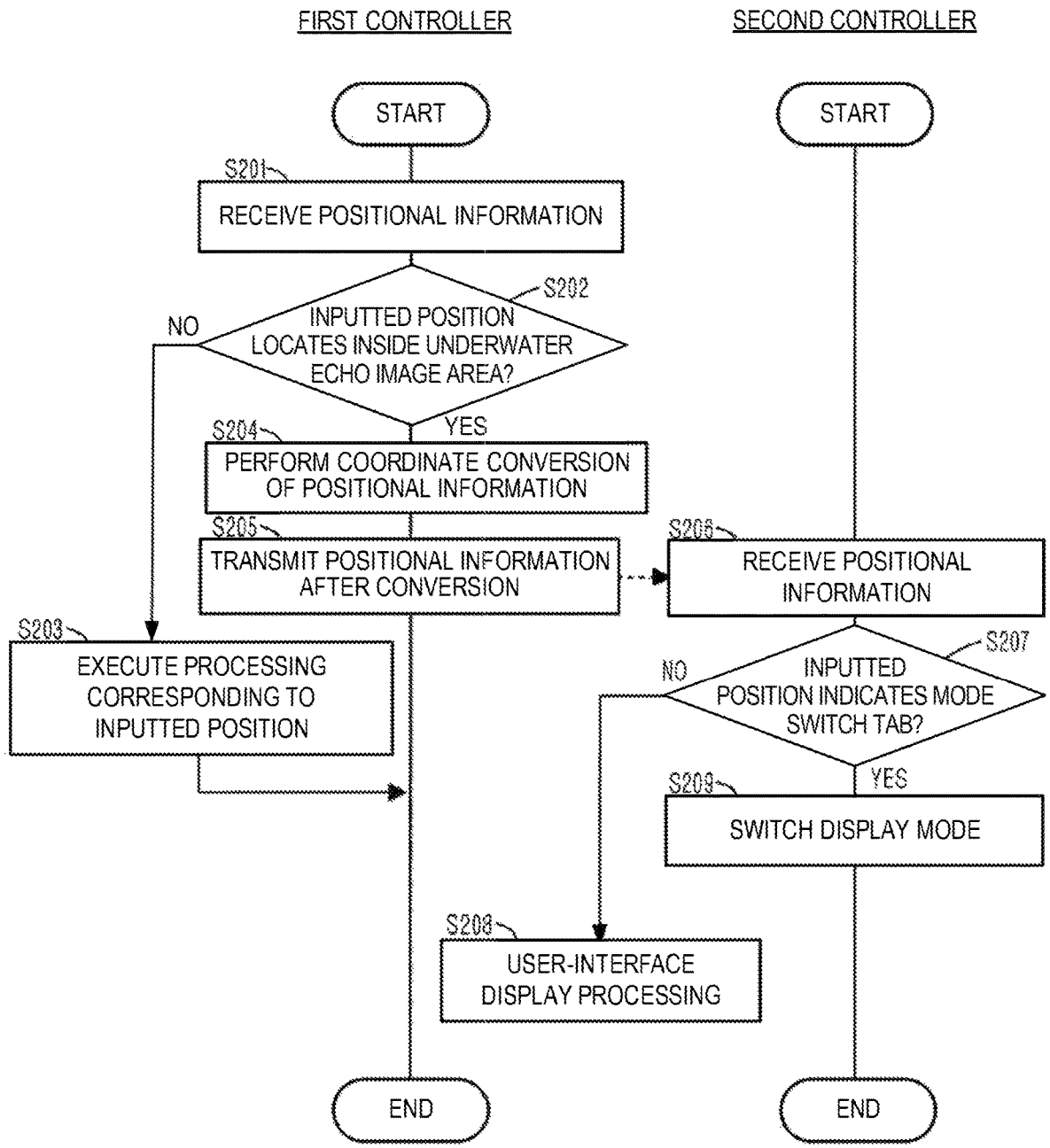
FIG. 11 is a flowchart illustrating display-mode switch processing executed by the ship information display device according to the embodiment.

FIG. 11 is a flowchart illustrating the display-mode switch processing executed by the ship information display device 100 according to this embodiment. When the user taps the input unit 410, the input unit 410 may detect the tapped position (coordinates), and then transmit corresponding coordinate information. The coordinate system of the input unit 410 may coincide with the coordinate system of the display unit 400, i.e., the coordinate system of the synthesized screen 900. Therefore, the input unit 410 may transmit the coordinate information in the synthesized screen 900 at the inputted position.

Referring to FIG. 2, in this embodiment, when the position of the input unit 410 is inputted, operation to the image currently displayed at this position may be performed. That is, when the user performs the operation to the nautical chart plotter image, he/she may input the position inside the display area 901 of the nautical chart plotter image. Similarly, when the user performs the operation to the radar image, he/she may input the position inside the display area 902 of the radar image, and when the user performs the operation to the underwater echo image, he/she may input the position inside the display area 903 of the underwater echo image. Since the nautical chart plotter image and the radar image are generated by the first controller 210, when the positions inside the display area 901 and 902 are inputted, corresponding inputted information may be given to the first controller 210, and the first controller 210 may execute the processing corresponding to the inputted information. Moreover, since the underwater echo image is generated by the second controller 220, when the position inside the display area 903 is inputted, corresponding inputted information may be given to the second controller 220, and the second controller 220 may execute the processing corresponding to the inputted information. Here, a control of the entire synthesized screen 900 may be executed by the first controller 210. For this reason, even when any position inside the entire area of the synthesized screen 900 is inputted, the information on the inputted position may be first given to the first controller 210. If the inputted position is located inside the display area 903, the first controller 210 may convert the coordinates of the positional information and then transmit it to the second controller 220.

Referring to FIG. 11, as described above, the coordinate information may be transmitted from the input unit 410 to the first controller 210, and the first controller 210 may receive the coordinate information (Step S201). The first controller 210 may determine whether the inputted position is located inside the display area 903 of the underwater echo image based on the received coordinate information (Step S202).

If the inputted position is located outside the display area 903 (i.e., if it is located inside the display areas 901 and 902 of the first image 910) (NO at Step S202), the first controller 210 may execute the processing corresponding to the coordinate position (Step S203). For example, if the inputted position is located at a specific position in the nautical chart plotter image, the first controller 210 may execute the processing for switching the nautical chart plotter from the 2D display to the 3D display. Moreover, if the inputted position is a detected position of another ship in the radar image, the first controller 210 may calculate a traveling direction, a ship speed, etc. of the another ship, and then execute the processing for displaying these information on the radar screen in the superimposed manner. Then, the first controller 210 may end the display-mode switch processing.

Figure 12:
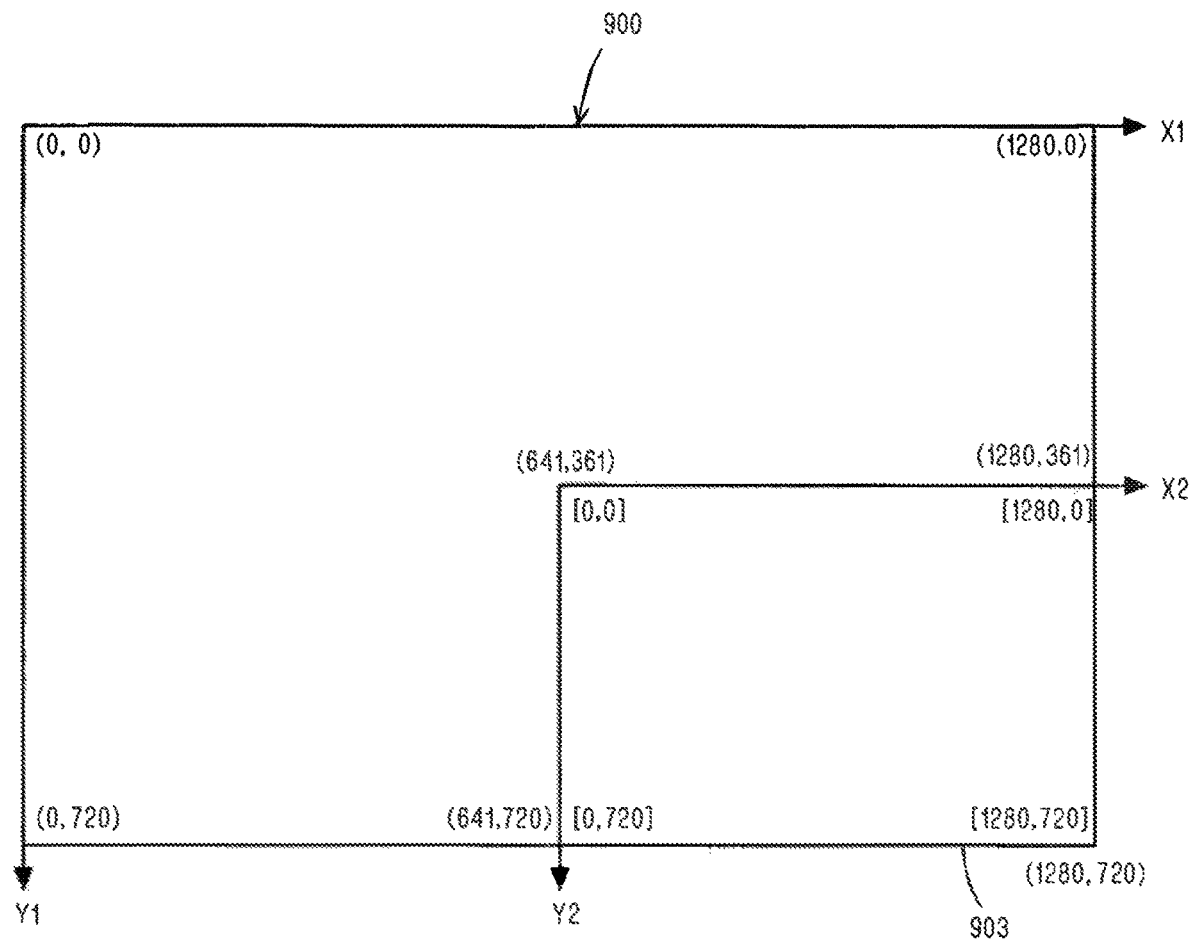
FIG. 12 is a schematic view illustrating two coordinate systems in a synthesized screen.

If the inputted position is located inside the display area 903 (YES at Step S202), the first controller 210 may perform the coordinate conversion of the positional information (Step S204). This coordinate conversion processing is described. FIG. 12 is a schematic view illustrating two coordinate systems in the synthesized screen 900. A coordinate system of the entire synthesized screen 900 may be defined in the synthesized screen 900, and this coordinate system may be the same as the coordinate system of the display unit 400. Below, this coordinate system of the entire synthesized screen 900 may be referred to as "the first coordinate system." Below, the coordinates in the first coordinate system may be indicated as (X1, Y1). The first coordinate system may have its origin (0, 0) at the upper left corner position of the synthesized screen 900, and may be provided with an X1-axis extending rightward and a Y1-axis extending downward, where the vertical and lateral lengths of one pixel are used as respective unit lengths. The X1-coordinates may increase to the right and the Y1-coordinates may increase to the downward direction. That is, in the first coordinate system, the upper right corner position of the synthesized screen 900 may be (1280, 0), the lower left corner position may be (0, 720), and the lower right corner position may be (1280, 720). Moreover, in the synthesized screen 900, a coordinate system of the display area 903 of the second image may be defined. Below, this coordinate system may be referred to as "the second coordinate system", and the coordinates in the second coordinate system may be indicated as [X2, Y2]. The second coordinate system may have its origin [0, 0] at the upper left corner position of the display area 903, and may be provided with an X2-axis extending rightward and a Y2-axis extending downward, where the vertical and lateral lengths of one pixel are used as respective unit lengths. The X2-coordinates may increase to the right and the Y2-coordinates may increase to the downward direction. That is, in the second coordinate system, the upper right corner position of the display area 903 may be [1280, 0], the lower left corner position may be [0, 720], and the lower right corner position may be [1280, 720]. The origin [0, 0] of the second coordinate system may correspond to (641, 361) of the first coordinate system, [1280, 0] of the second coordinate system may correspond to (1280, 361) of the first coordinate system, [0, 720] of the second coordinate system may correspond to (641, 720) of the first coordinate system, and [1280, 720] of the second coordinate system may correspond to (1280, 720) of the first coordinate system.

The coordinate information given from the input unit 410 may be used in the first coordinate system, and when the coordinates of the position outside the display area 903 of the second image are given to the first controller 210, the first controller 210 may execute processing of Step S203 using the coordinates. On the other hand, when the coordinates of the position inside the display area 903 are outputted from the input unit 410, the second controller 220 may need to execute processing corresponding to this position. However, since the coordinates just outputted from the input unit 410 are to be used in the first coordinate system, appropriate processing cannot be executed based on the coordinates as they are. For this reason, the first controller 210 may execute the coordinate conversion processing for converting the coordinate information in the first coordinate system given from the input unit 410 into the coordinate information in the second coordinate system.

Again referring to FIG. 11, the first controller 210 may transmit the positional information after the coordinate conversion to the second controller 220 (Step S205), and the second controller 220 may then receive the converted positional information (Step S206). The second controller 220 may determine whether the received positional information indicates the position of the mode switch tab 904 (Step S207). If the positional information does not indicate the position of the mode switch tab 904 (NO at Step S207), user-interface display processing (described later) may be performed (Step S208). On the other hand, if the positional information indicates the position of the mode switch tab 904 (YES at Step S207), the second controller 220 may switch the display mode from the 3D mode to the 2D mode (Step S209). As above, the display-mode switch processing may be finished. In subsequent synthesized screen display processing, each time the second controller 220 receives the echo information, it may generate the 2D echo image as the second image. Thus, the 2D echo image may be displayed in the display area 903 of the synthesized screen 900.

[User-Interface Display Processing]

Figure 13:
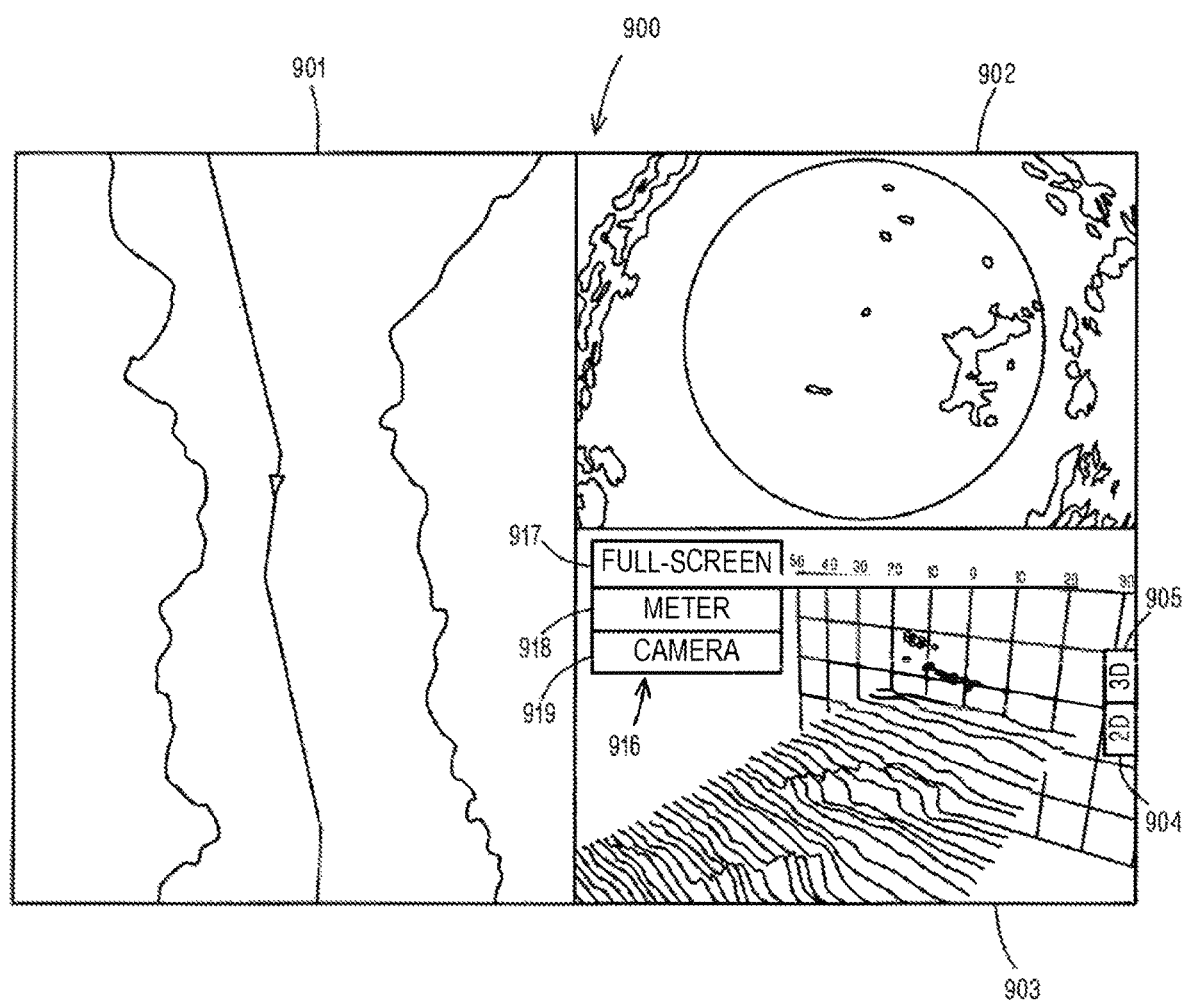
FIG. 13 is a view illustrating one example of the synthesized screen where a user interface is displayed.

In a case where the underwater echo image (the 2D underwater echo image or the 3D underwater echo image) is displayed, if a position other than the mode switch tabs 904 and 905 of the display area 903 is tapped, a user interface for switching operation of the display screen may be displayed. FIG. 13 is a view illustrating one example of the synthesized screen 900 where the user interface is displayed. The user interface 916 may be displayed at the tapped position inside the display area 903. The user interface 916 may include a first switch part 917 for switching the screen from the synthesized screen 900 to a full-screen display of the underwater echo image, a second switch part 918 for switching the underwater echo image of the synthesized screen 900 to the meter image, and a third switch part 919 for switching the underwater echo image of the synthesized screen 900 to the camera image.

Figure 14:
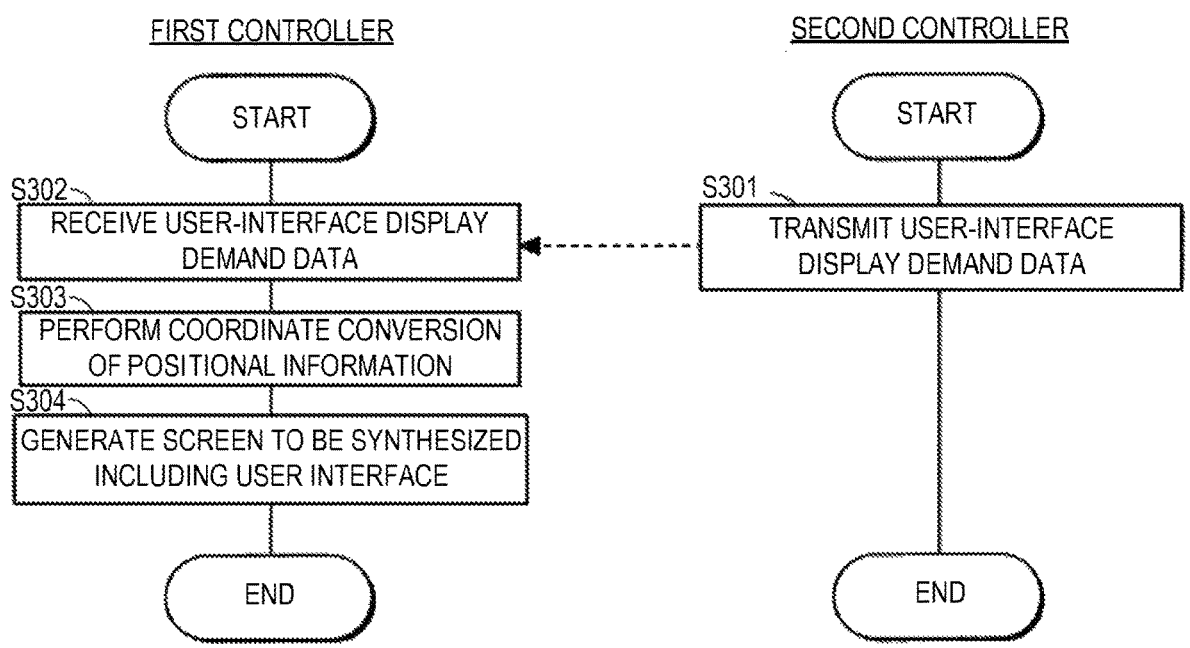
FIG. 14 is a flowchart illustrating user-interface display processing executed by the ship information display device according to the embodiment.

FIG. 14 is a flowchart illustrating the user-interface display processing executed by the ship information display device 100 according to this embodiment. If the positional information of which the coordinates are converted as described above and which is given to the second controller 220 indicates a position other than the mode switch tabs 904 and 905, the user-interface display processing may be started. Note that, when the 3D underwater echo image is currently displayed in the display area 903, the mode switch tab 905 is inoperable and no processing may be executed at all even if the tab is tapped. Similarly, when the 2D underwater echo image is currently displayed in the display area 903, the mode switch tab 904 is inoperable and no processing may be executed at all even if the tab is tapped.

Figure 15:
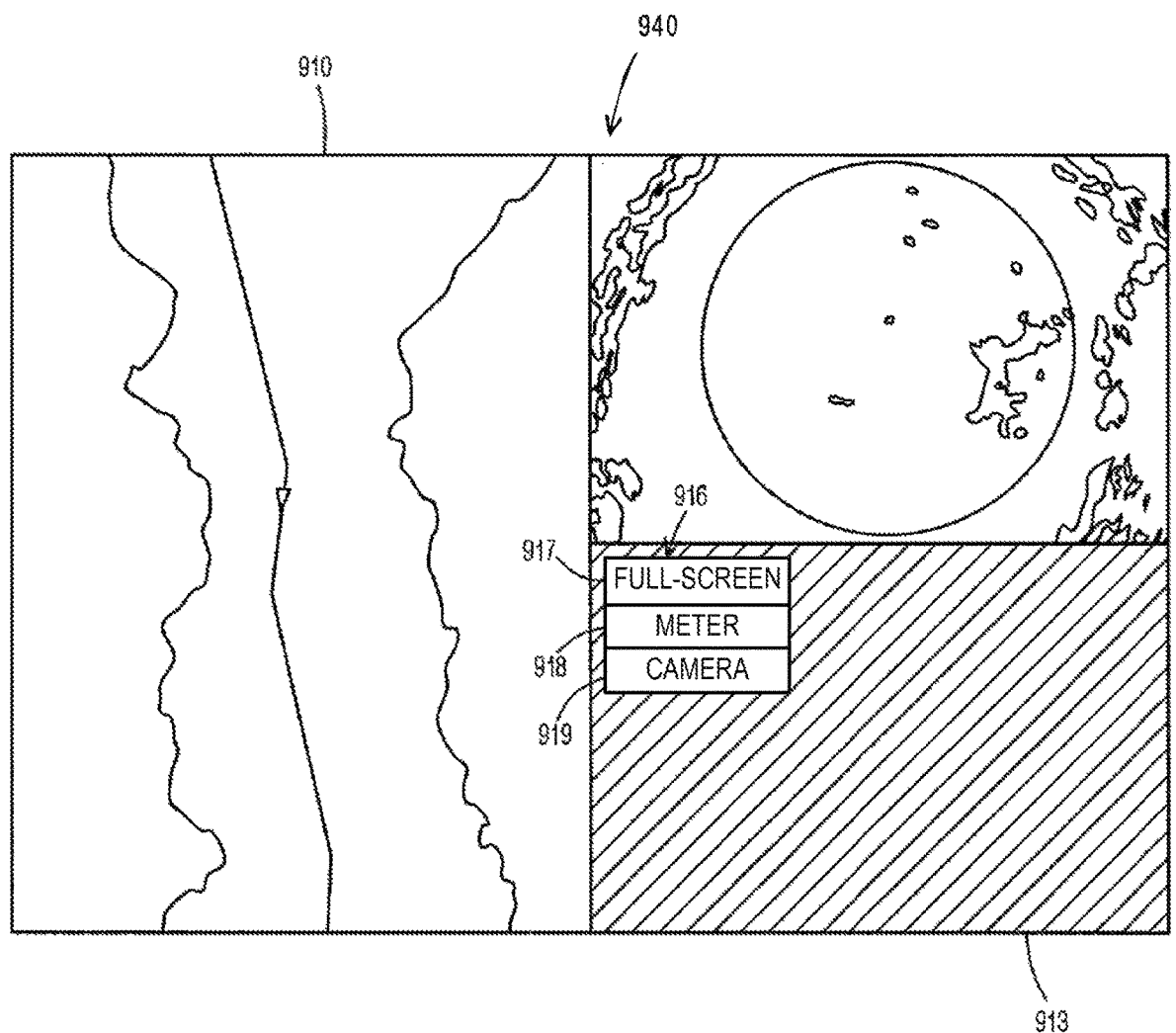
FIG. 15 is a view illustrating one example of the screen to be synthesized including the user interface.

When the user-interface display processing begins, the second controller 220 may transmit to the first controller 210 user-interface display demand data including the positional information given to the second controller 220 (Step S301). The first controller 210 may receive the user-interface display demand data (Step S302), extract the positional information from the demand data, and convert it into the positional information of the first coordinate system (Step S303). Next, the first controller 210 may generate the screen to be synthesized including the user interface 916 at the coordinates obtained by the coordinate conversion (Step S304). FIG. 15 is a view illustrating one example of the screen to be synthesized including the user interface. The screen to be synthesized 940 may include the first image 910, and the blank image 913 on the lower right side of the first image 910, and have the user interface 916 inside the blank image 913.

As above, the user-interface display processing may be finished. In subsequent synthesized screen display processing, the first controller 210 may generate the screen to be synthesized 940 including the user interface 916 in the blank image 913. Thus, by generating the screen to be synthesized 940 where the user interface 916 is provided to the blank image 913, the graphic processor 300 may generate the first layer from the screen to be synthesized 940, superimpose the first layer on the second layer including the underwater echo image, and execute the transparent processing of the pixels in the transparent color, to generate the synthesized screen 900 where the user interface 916 is provided to the display area 903 of the underwater echo image (see FIG. 13). Note that, if a given period of time passes without the user interface being operated, the user interface may be hidden. In this case, in the synthesized screen display processing, the first controller 210 may generate the screen to be synthesized where the user interface 916 is not included in the blank image 913.

[User-Interface Move Processing]

Next, user-interface move processing which moves the user interface within the display area 903 is described. The user can give to the input unit 410 an instruction for changing the position of the user interface 916. This instruction may be operation in which, for example, a position of the user interface 916 is touched on the input unit 410 by a finger, and the finger is moved so as to be slid on the input unit 410 (hereinafter, referred to as "swipe").

Figure 16:
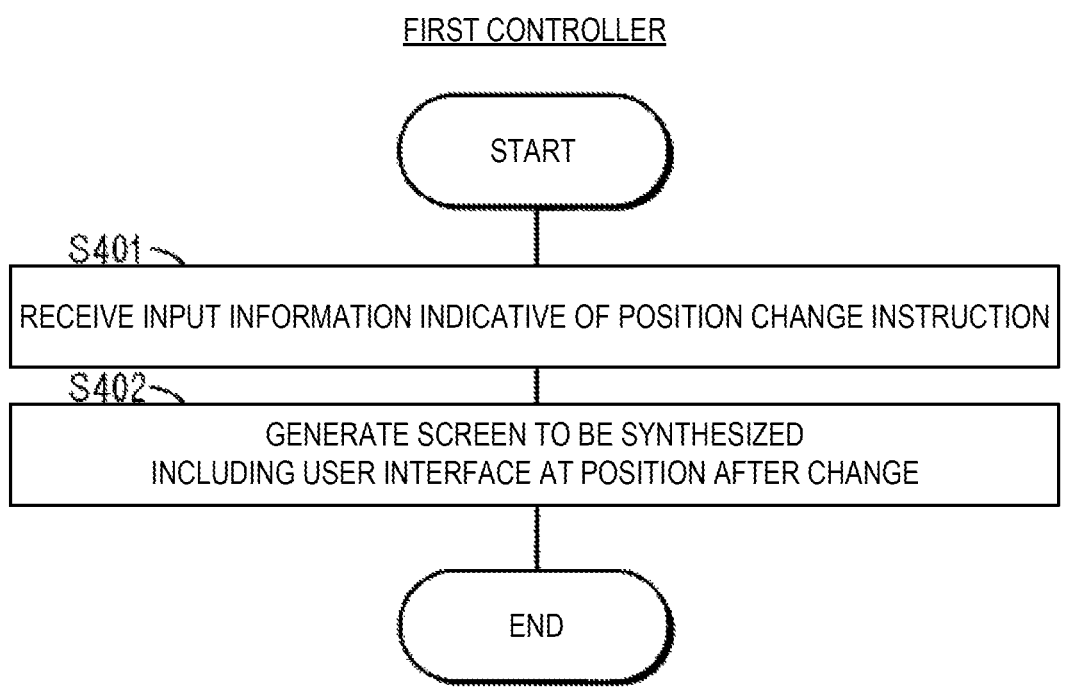
FIG. 16 is a flowchart illustrating user-interface move processing executed by the ship information display device according to the embodiment.
Figure 17:
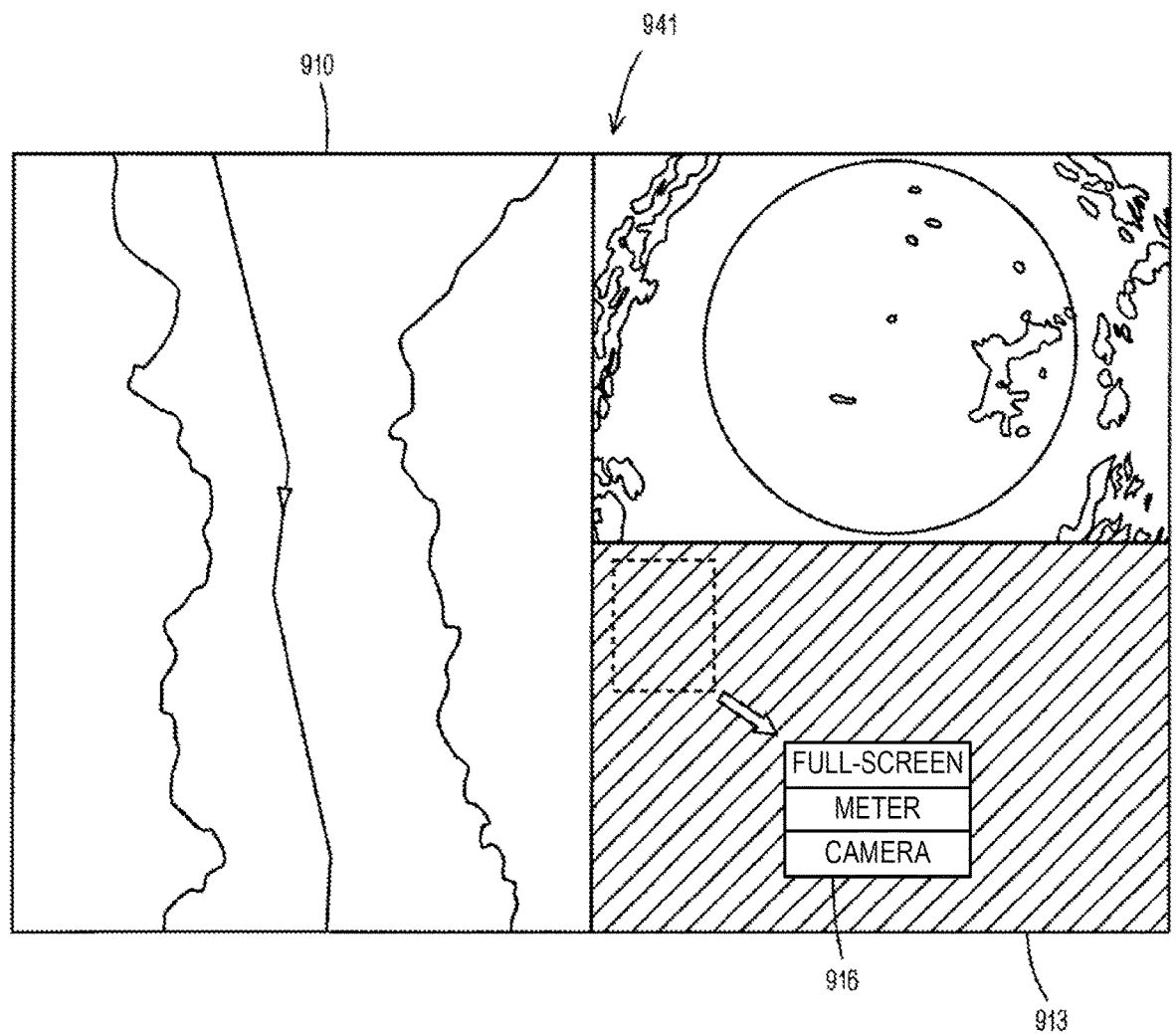
FIG. 17 is a view illustrating one example of a screen to be synthesized when the position of the user interface is changed.

FIG. 16 is a flowchart illustrating the user-interface move processing executed by the ship information display device 100 according to this embodiment. When the position change instruction of the user interface 916 is given by the swipe etc., the input unit 410 may transmit input information indicative of the position change instruction, and the first controller 210 may then receive this input information (Step S401). Note that the input information may include coordinate information on the position after the change. The first controller 210 may generate the screen to be synthesized including the user interface 916 at coordinates of the position after the change (Step S402). FIG. 17 is a view illustrating one example of the screen to be synthesized when the position of the user interface is changed. The screen to be synthesized 941 may include the first image 910, the blank image 913 on the lower right side of the first image 910, and the user interface 916 at a new position (position after the change) of the blank image 913. As above, the user-interface display processing may be finished. In subsequent synthesized screen display processing, the first controller 210 may generate the screen to be synthesized 941 including the user interface 916 at the position after being moved (destination) in the blank image 913.

[Display Switch Processing]

Next, the display switch processing for switching from the synthesized screen 900 to another screen display is described. The user can tap the first switch part 917 of the user interface 916 to give the ship information display device 100 a switch instruction to the full-screen display mode in which the underwater echo image is displayed in a full-screen manner. Moreover, the user can tap the second switch part 918 of the user interface 916 to give the ship information display device 100 a switch instruction to the meter screen display mode in which the synthesized screen including the meter image instead of the underwater echo image is displayed, and can tap the third switch part 919 to give the ship information display device 100 a switch instruction to the camera screen display mode in which the synthesized screen including the camera image instead of the underwater echo image is displayed.

Figure 18:
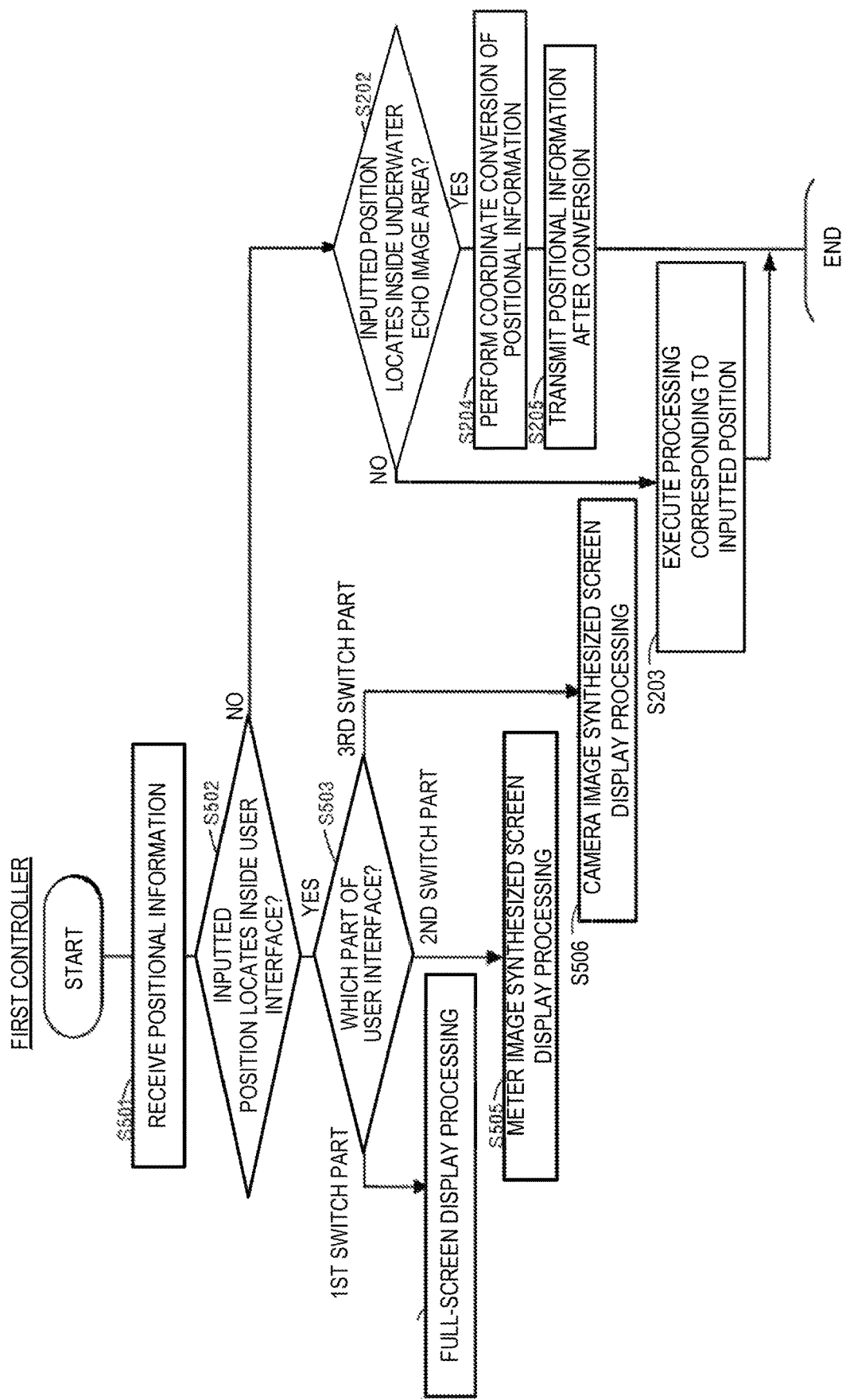
FIG. 18 is a flowchart illustrating display switch processing executed by the ship information display device according to the embodiment.

FIG. 18 is a flowchart illustrating the display switch processing executed by the ship information display device 100 according to this embodiment. In the state where the synthesized screen 900 including the underwater echo image in the display area 903 is displayed, when the user taps the input unit 410, the input unit 410 may detect the tapped position (coordinates), and may then transmit this coordinate information. The input unit 410 may transmit the coordinate information to the first controller 210, and the first controller 210 may then receive this coordinate information (Step S501). As described above, the user interface 916 may be provided inside the blank image 913 of the screen to be synthesized 940, and may be displayed so as to be superimposed on the underwater echo image without the transparent processing being applied. That is, the operation performed to the user interface 916 may be a subject to be processed by the first controller 210. Therefore, the first controller 210 may determine whether the inputted position is located inside the user interface 916 using the received coordinate information (Step S502).

If the inputted position is located outside the user interface 916 (NO at Step S502), the user may have tapped a part other than the user interface 916 in the screen. For this reason, the ship information display device 100 may execute processings after Step S202 of the display-mode switch processing described above.

On the other hand, if the inputted position is located inside the user interface 916 (YES at Step S502), the first controller 210 may determine which part of the user interface 916 is the inputted position (Step S503). If the inputted position is at the first switch part 917 ("the first switch part" at Step S503), the first controller may execute full-screen display processing (Step S504) and if an inputted position is at the second switch part 918 ("second switch part" at Step S503), the first controller may execute meter image synthesized screen display processing (Step S505), and if the inputted position is at the third switch part 919 ("the third switch part" at Step S503), the first controller may execute camera image synthesized screen display processing (Step S506).

[Full-Screen Display Processing]

Figure 19:
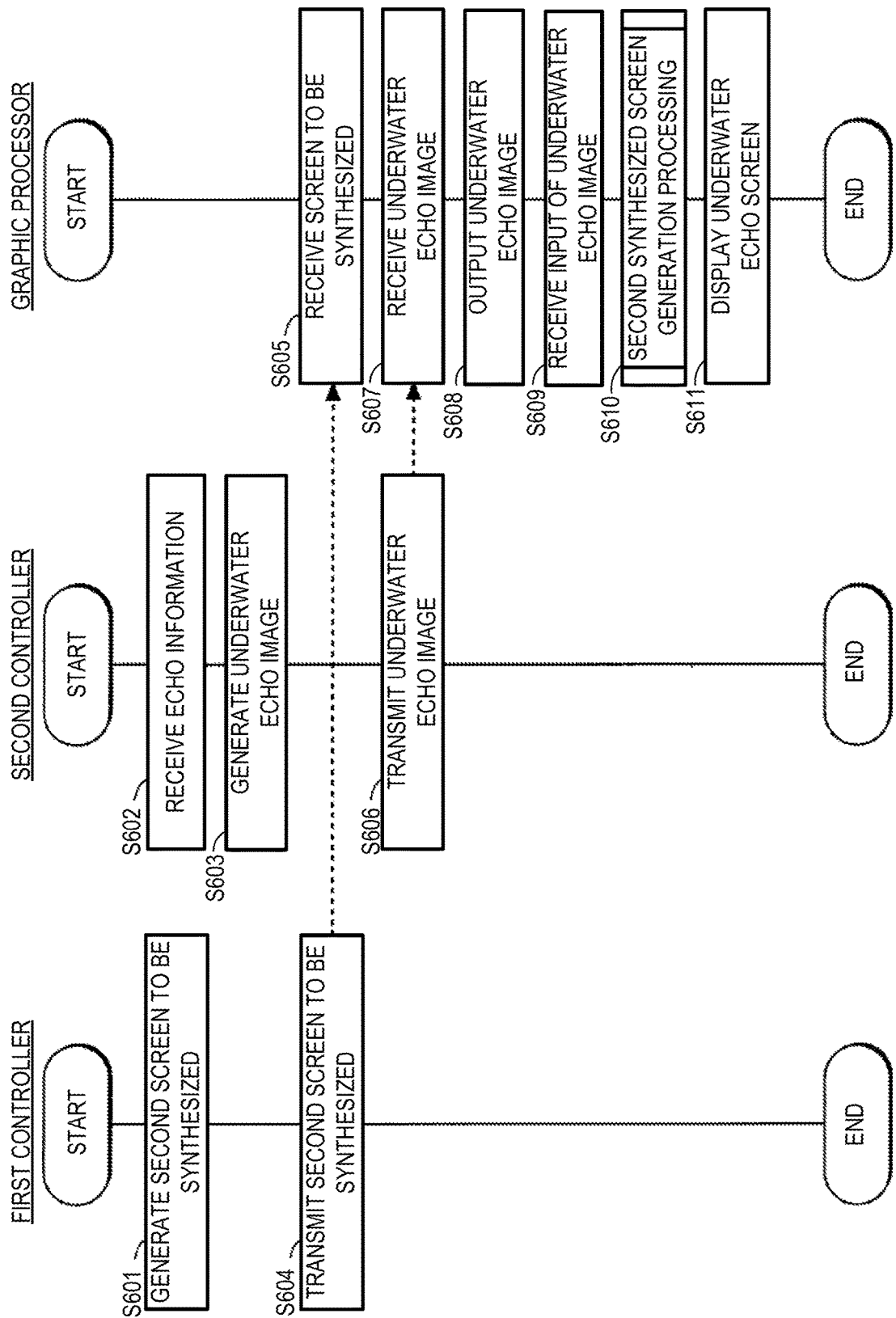
FIG. 19 is a flowchart illustrating full-screen display processing executed by the ship information display device according to the embodiment.

If the first switch part 917 is tapped, the screen may be switched to a full-screen display mode, and the following full-screen display processing may be executed. FIG. 19 is a flowchart illustrating the full-screen display processing executed by the ship information display device 100 according to this embodiment.

Figure 20:
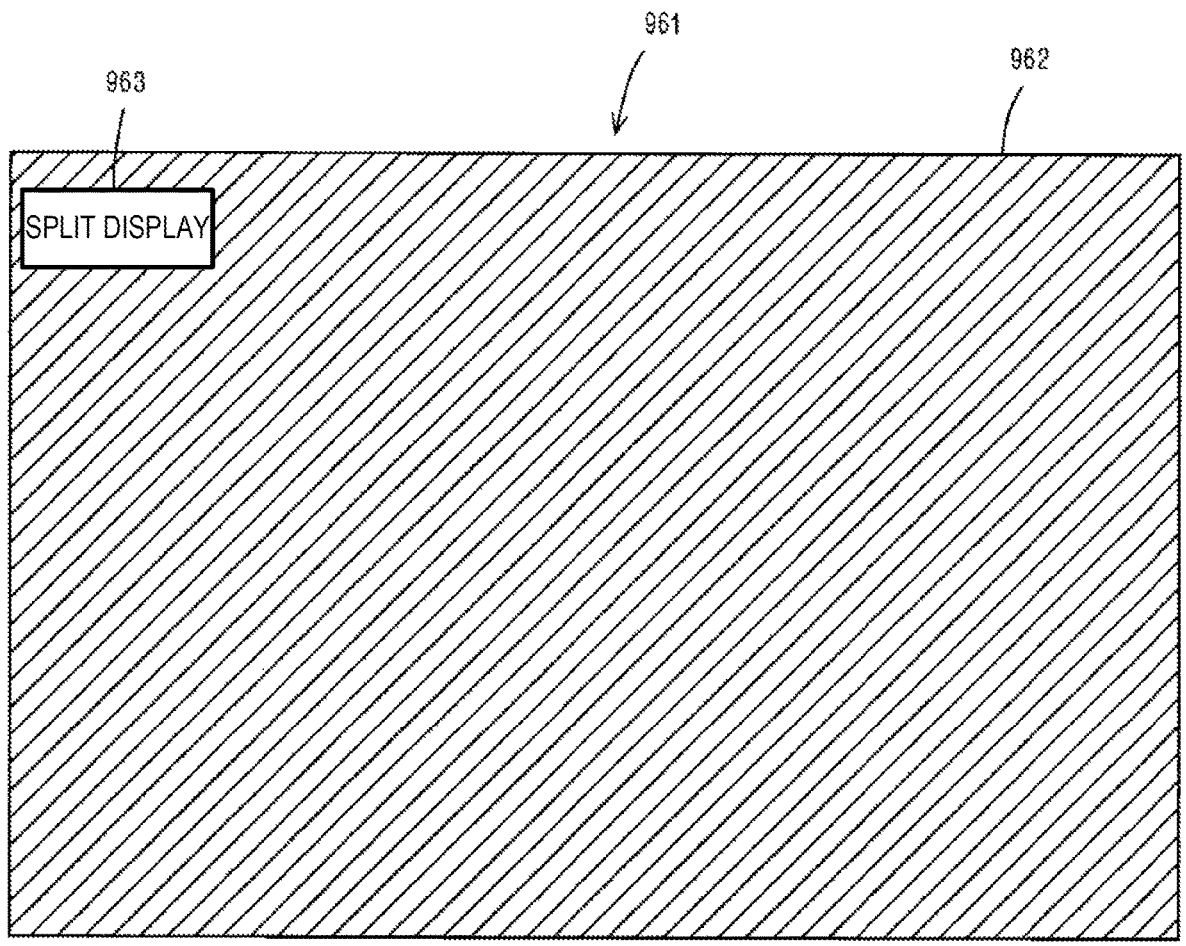
FIG. 20 is a view illustrating one example of a second screen to be synthesized.

In the full-screen display processing, the first controller 210 may first generate a second screen to be synthesized where the entire screen is the blank image (Step S601). FIG. 20 is a view illustrating one example of the second screen to be synthesized. The second screen to be synthesized 961 may be, for example, an image of 1280×720 pixels in the lateral directions and vertical directions, respectively, where the user interface 963 is provided to part of the screen and other part is the blank image 962. That is, the second image to be synthesized 961 may be an image where all pixels other than the user interface 963 are made in the transparent color.

Again referring to FIG. 19, the second controller 220 may receive the echo information which is the second ship information (Step S602). Next, the second controller 220 may generate the underwater echo image which is the second image based on the received echo information (Step S603). The first controller 210 may transmit to the graphic processor 300 the second screen which is generated as described above as the image signal (Step S604), and the graphic processor 300 may then receive the second screen to be synthesized (Step S605). On the other hand, the second controller 220 may transmit the generated underwater echo image to the graphic processor 300 as the image signal (Step S606), and the graphic processor 300 may then receive the echo image (Step S607). The processings of the first controller 210 and the second controller 220 may be ended after the transmission of the image signal.

The graphic processor 300 may output from the output terminal 310 the image signal of the underwater echo image received from the second controller 220 (Step S608). The outputted image signal may be outputted to the exterior from the external output terminal 510, and may be inputted from the external input terminal 520 through the cable 530. This image signal may be transmitted from the external input terminal 520 to the input terminal 320, and may be then inputted into the graphic processor 300 (Step S609). The graphic processor 300 may execute second synthesized screen generation processing when it receives the image signal of the underwater echo image (Step S610).

Figure 21:
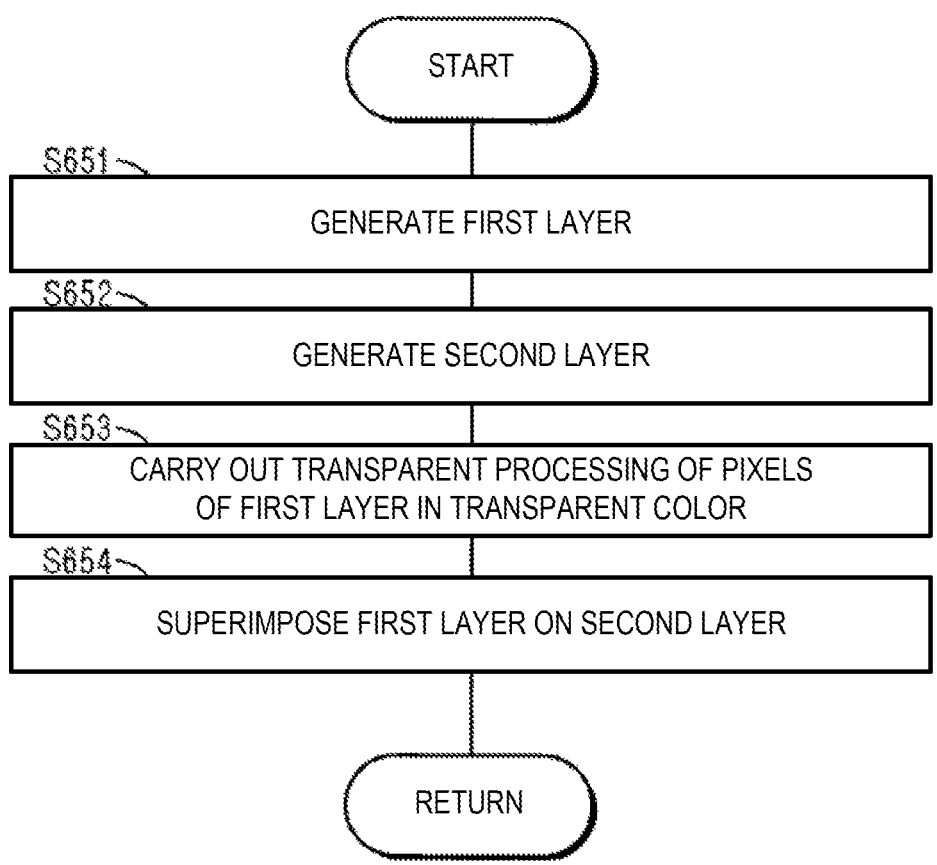
FIG. 21 is a flowchart illustrating second synthesized screen generation processing.
Figure 22:
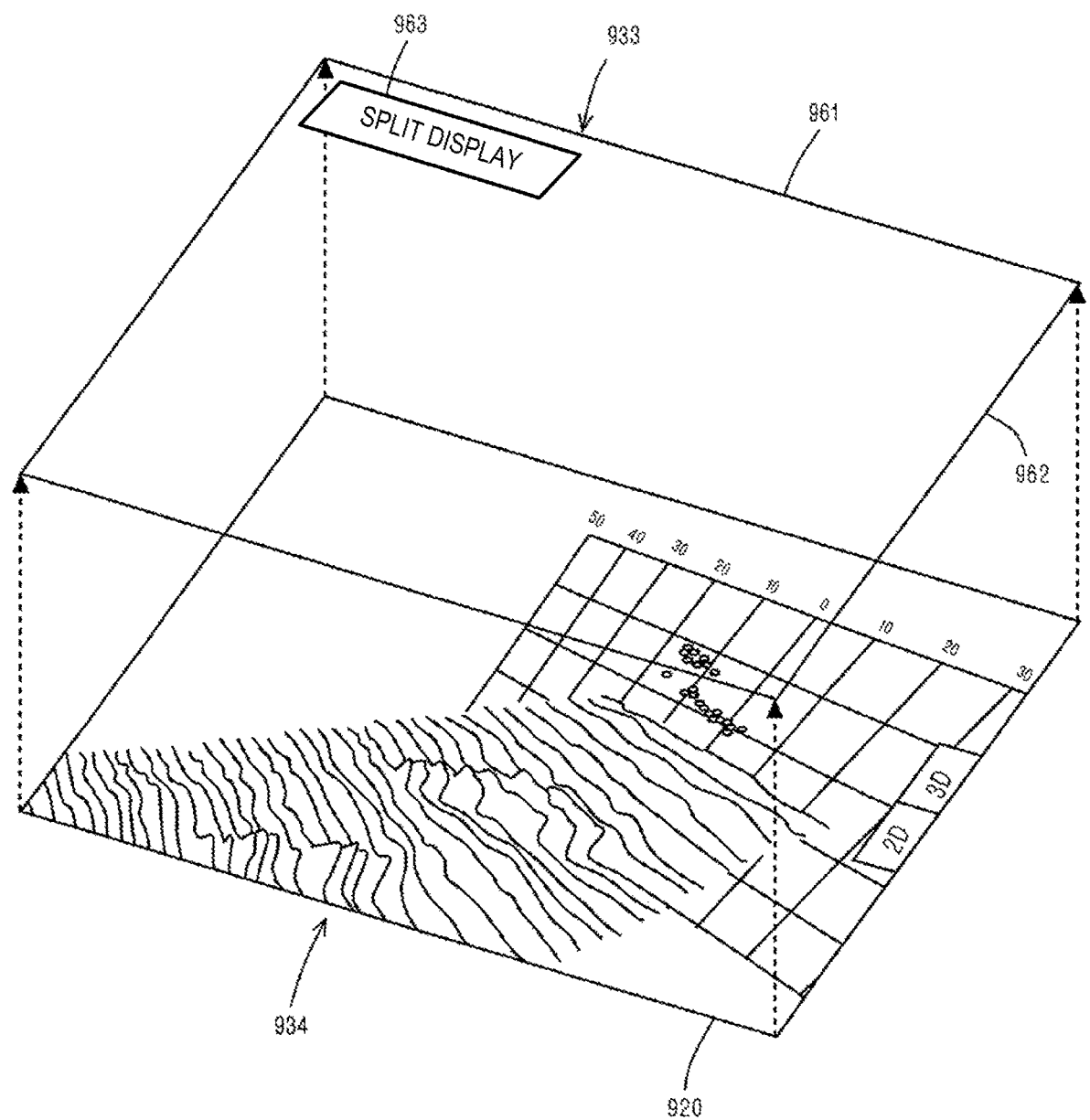
FIG. 22 is a schematic view illustrating the second synthesized screen generation processing.
Figure 23:
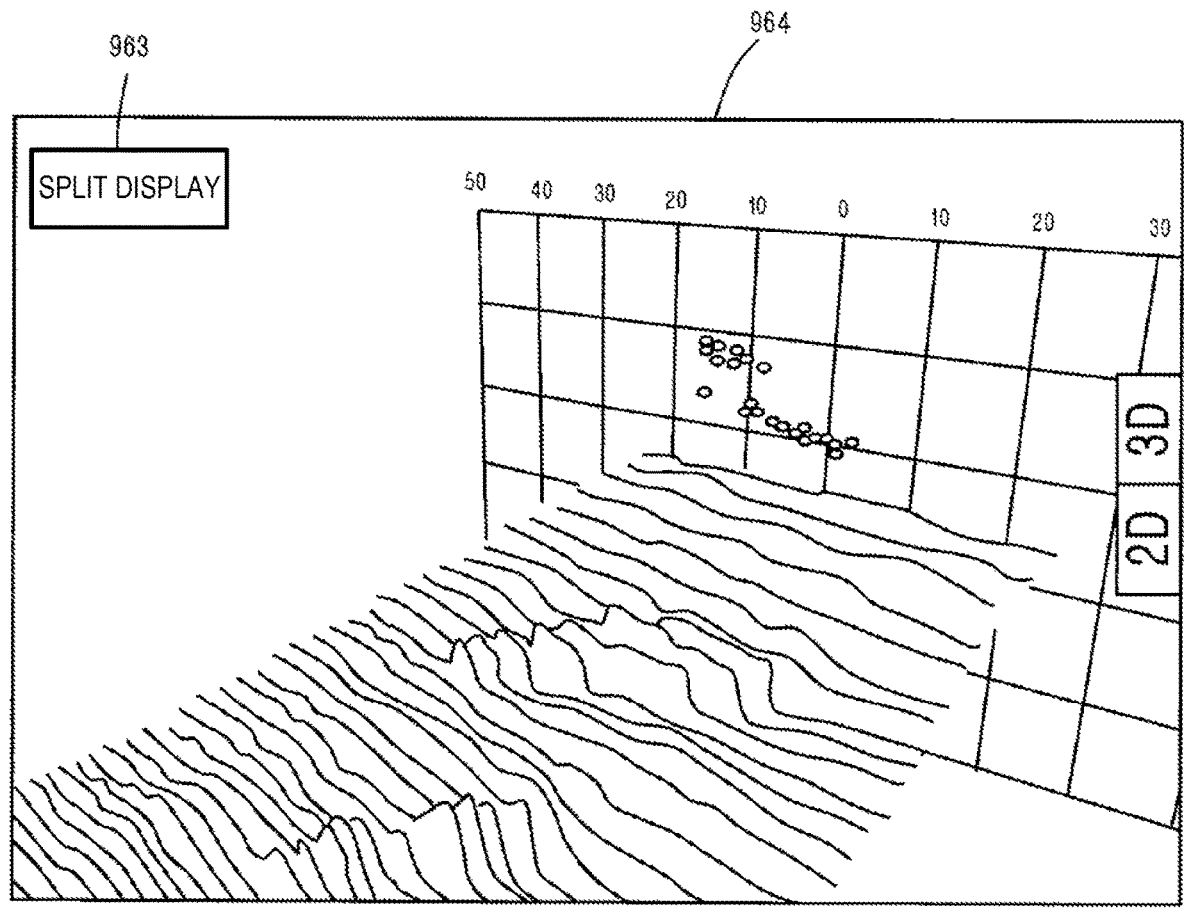
FIG. 23 is a view illustrating one example of an underwater echo screen.

Below, the second synthesized screen generation processing is described in detail. FIG. 21 is a flowchart illustrating the second synthesized screen generation processing, and FIG. 22 is a schematic view illustrating the outline of the processing. In the second synthesized screen generation processing, the graphic processor 300 may generate the first layer 933 including the second screen to be synthesized 961 (Step S651), and generate the second layer 934 including the underwater echo image 920 (Step S652). The graphic processor 300 may then carry out the transparent processing of the pixels of the first layer 933 in the transparent color (Step S653). Thus, the blank image 962 may be processed to be transparent. Next, the graphic processor 300 may superimpose the first layer 933 (surface side) on the second layer 934 (background side) so that the positions of the blank image 962 and the underwater echo image 920 coincide with each other (Step S654). Thus, the underwater echo image 920 may appear through the blank image 962. In other words, the blank image 962 may be replaced by the underwater echo image 920. Here, since the size of the blank image 962 is the same as that of the second screen to be synthesized 961 and the size of the underwater echo image 920 is also the same as these, the underwater echo screen which is the second synthesized screen where the entire screen becomes the underwater echo image 920 by the processing described above may be generated. FIG. 23 is a view illustrating one example of the underwater echo screen. The underwater echo screen 964 may be provided at a part thereof with the user interface 963, and other part may be the underwater echo image. The user interface 963 may be a button for switching the screen display to the synthesized screen 900.

Again referring to FIG. 19, when the second synthesized screen generation processing is finished, the graphic processor 300 may output the image signal of the generated underwater echo screen 964 to the display unit 400, and then display the underwater echo screen 964 on the display unit 400 (Step S611). As above, the full-screen display processing may be finished. The ship information display device 100 repeatedly may execute the full-screen display processing described above at a given time interval to update the underwater echo screen 964 on real time.

As illustrated in FIG. 23, the user interface 963 may be provided to the underwater echo screen 964, and the user can tap the user interface 963 to give the ship information display device 100 the display switch instruction to the synthesized screen 900. When the ship information display device 100 receives the display switch instruction to the synthesized screen 900, it may switch the mode to the 3D mode or 2D mode, and execute the synthesized screen display processing to display the synthesized screen 900.

[Meter Image Synthesized Screen Display Processing]

Figure 24:
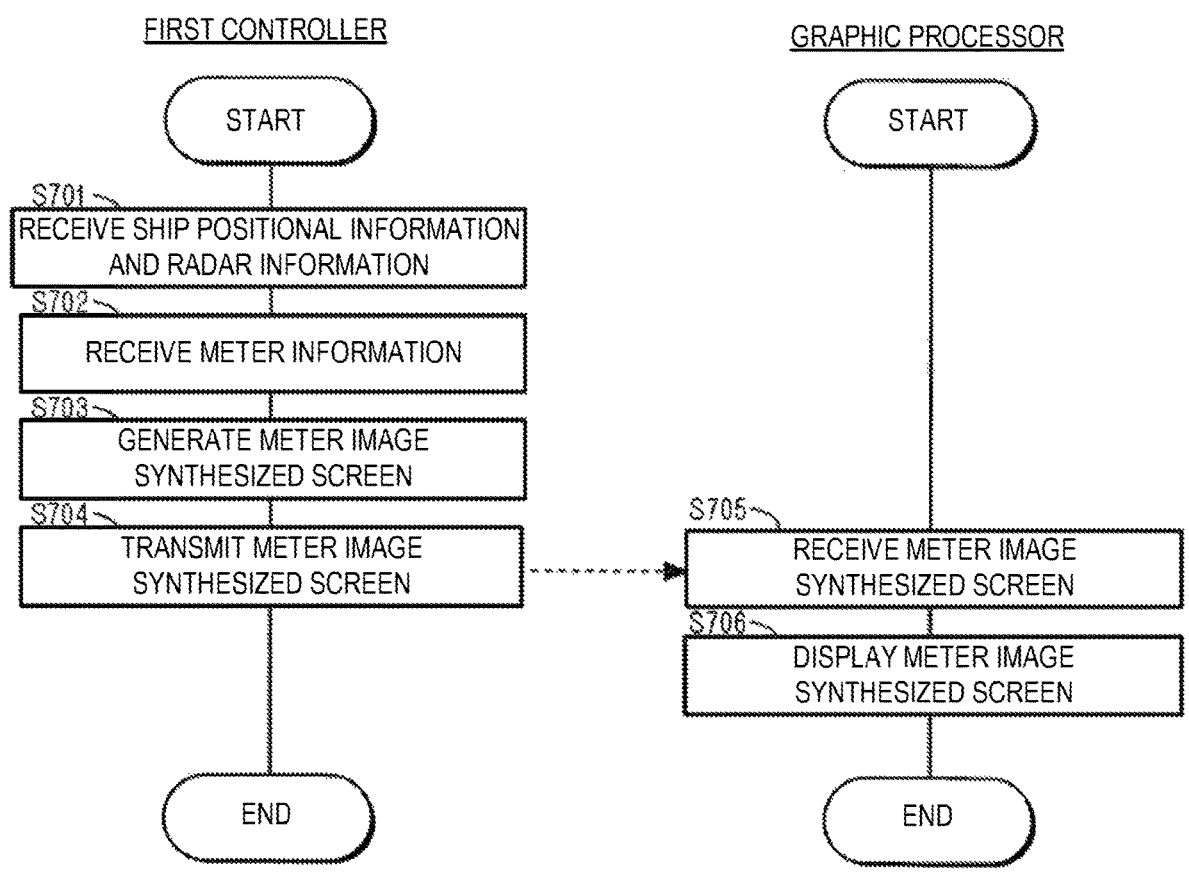
FIG. 24 is a flowchart illustrating meter image synthesized screen display processing executed by the ship information display device according to the embodiment.

When the second switch part 918 is tapped, the mode may be switched to the meter screen display mode, and the following meter image synthesized screen display processing may be executed. FIG. 24 is a flowchart illustrating the meter image synthesized screen display processing executed by the ship information display device 100 according to this embodiment.

The GNSS receiver 811, the radar device 812, and the meter 831 may constantly transmit the positional information of the ship, the radar information, and the meter information at a given time interval, respectively. In the meter image synthesized screen display processing, first, the first controller 210 may receive the ship positional information and the radar information which are the first ship information (Step S701), and receive the meter information which is the third ship information (Step S702).

Figure 25:
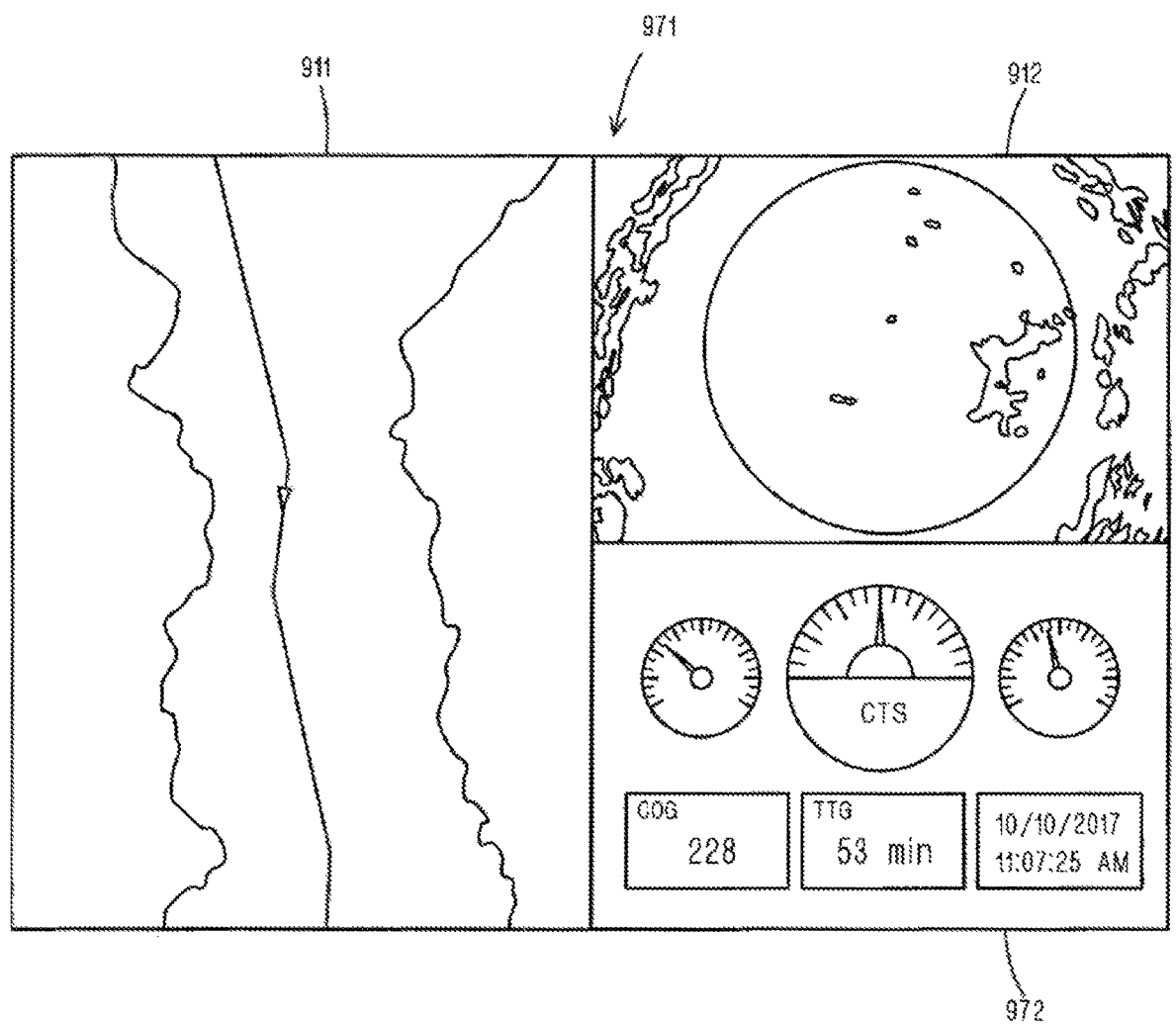
FIG. 25 is a view illustrating one example of a meter image synthesized screen.

Next, the first controller 210 may read the nautical chart around the ship from the memory unit 700, and generate the display screen including the nautical chart plotter image, the radar image, and the meter image which is the third image (hereinafter, the display screen may be referred to as "the meter image synthesized screen") (Step S703). FIG. 25 is a view illustrating one example of the meter image synthesized screen. The meter image synthesized screen 971 of this example may include the nautical chart plotter image 911 having a vertically elongated rectangular shape, the radar image 912 having a laterally elongated rectangular shape, and the meter image 972 having a laterally elongated rectangular shape. The nautical chart plotter image 911 and the radar image 912 may be similar to those included in the first image 910 described above. The meter image 972 may have the same vertical and lateral lengths as the radar image 912. In the meter image synthesized screen 971, the nautical chart plotter image 911 may be located on the left side and the radar image 912 may be located on the right side so that upper ends thereof are aligned, and the meter image 972 may be located at the lower right side of the nautical chart plotter image 911, i.e., below the radar image 912.

Again referring to FIG. 24, the first controller 210 may transmit to the graphic processor 300 the meter image synthesized screen 971 generated as described above as the image signal (Step S704), and the graphic processor 300 may then receive the meter image synthesized screen 971 (Step S705). The first controller 210 may end the processing after the transmission of the image signal.

The graphic processor 300 may output the image signal of the received meter image synthesized screen 971 to the display unit 400, and display the meter image synthesized screen 971 on the display unit 400 (Step S706). As above, the meter image synthesized screen display processing may be finished. The ship information display device 100 may repeatedly execute the meter image synthesized screen display processing at a given time interval to update the meter image synthesized screen 971 on real time.

[Camera Image Synthesized Screen Display Processing]

Figure 26:
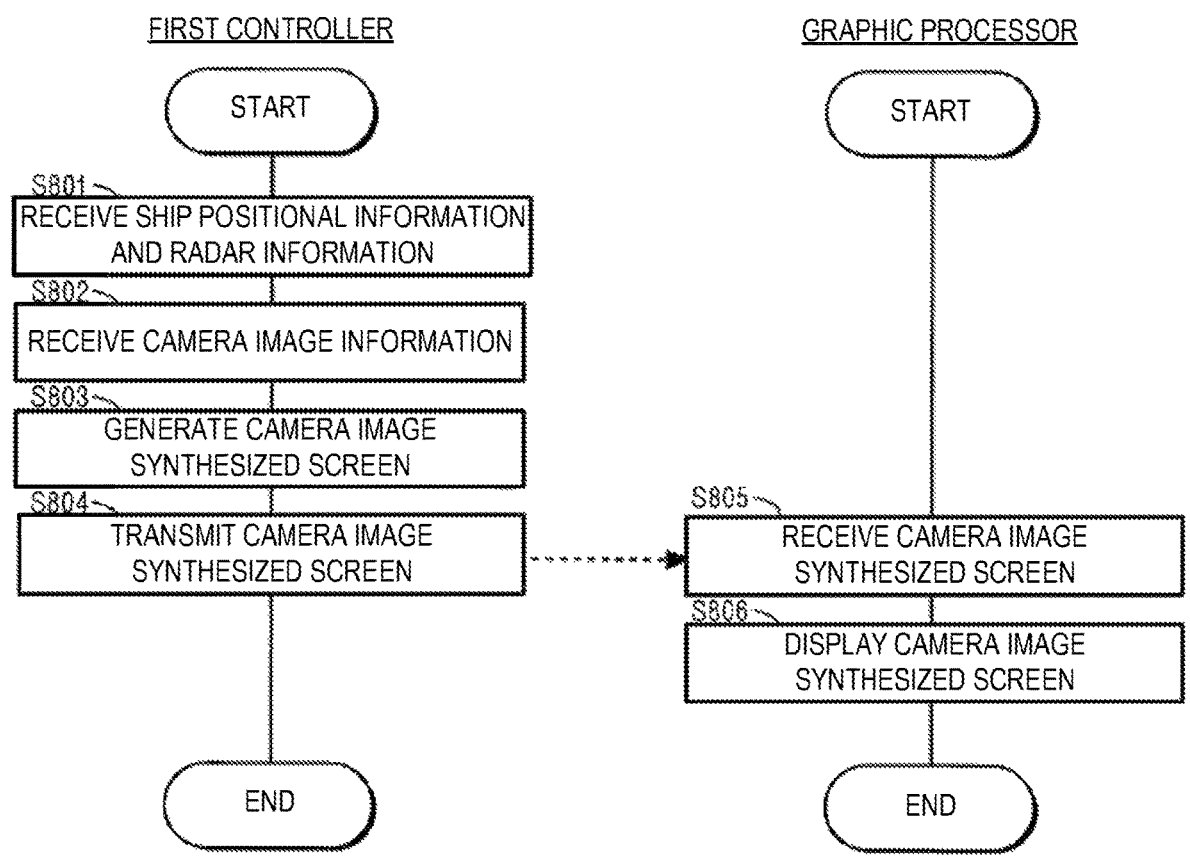
FIG. 26 is a flowchart illustrating camera image synthesized screen display processing executed by the ship information display device according to the embodiment.

When the third switch part 919 is tapped, the mode may be switched to the camera screen display mode, and the following camera image synthesized screen display processing may be executed. FIG. 26 is a flowchart illustrating the camera image synthesized screen display processing executed by the ship information display device 100 according to this embodiment.

The GNSS receiver 811, the radar device 812, and the camera 840 may constantly transmit the positional information of the ship, the radar information, and the camera image information at a given time interval, respectively. In the camera image synthesized screen display processing, first, the first controller 210 may receive the ship positional information and the radar information which are the first ship information (Step S801), and receive the camera image information (Step S802).

Figure 27:
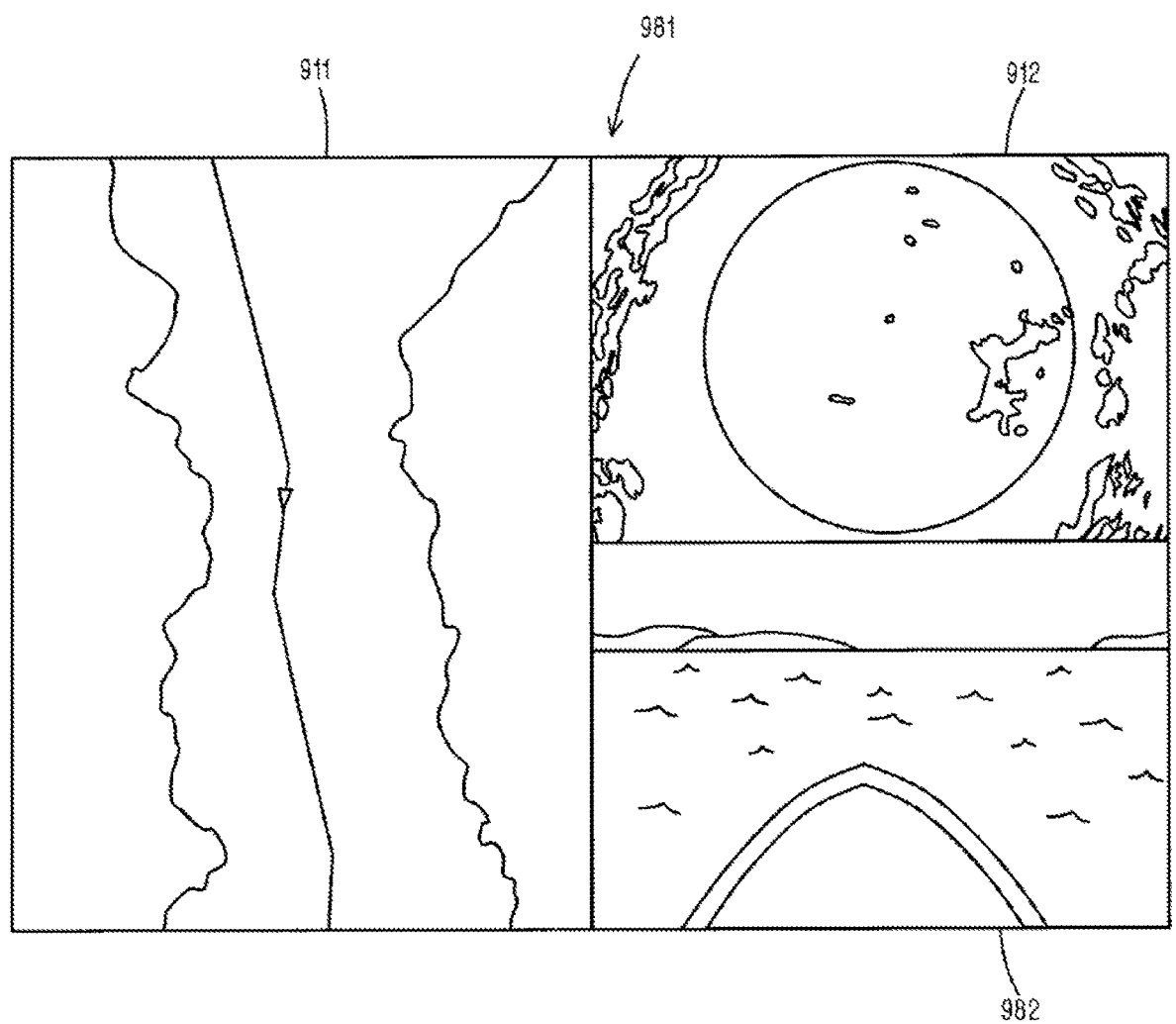
FIG. 27 is a view illustrating one example of a camera image synthesized screen.

Next, the first controller 210 may read the nautical chart around the ship from the memory unit 700, and generate the display screen including the nautical chart plotter image, the radar image, and the camera image which is the third image (hereinafter, the display screen may be referred to as "the camera image synthesized screen") (Step S803). FIG. 27 is a view illustrating one example of the camera image synthesized screen. The camera image synthesized screen 981 of this example may include the nautical chart plotter image 911 having a vertically elongated rectangular shape, the radar image 912 having a laterally elongated rectangular shape, and the camera image 982 having a laterally elongated rectangular shape. The nautical chart plotter image 911 and the radar image 912 may be the same as those included in the first image 910 described above. The camera image 982 may have the same vertical and lateral lengths as the radar image 912. In the camera image synthesized screen 981, the nautical chart plotter image 911 may be located on the left side and the radar image 912 may be located on the right side so that their upper ends are aligned, and the camera image 982 may be located on the lower right side of the nautical chart plotter image 911, i.e., below the radar image 912.

Again referring to FIG. 26, the first controller 210 may transmit to the graphic processor 300 the camera image synthesized screen 981 generated as described above as the image signal (Step S804), and the graphic processor 300 may then receive this synthesized screen (Step S805). The first controller 210 may end the processing after the transmission of the image signal.

The graphic processor 300 may output the image signal of the received camera image synthesized screen 981 to the display unit 400, and display the camera image synthesized screen 981 on the display unit 400 (Step S806). As above, the camera image synthesized screen display processing may be finished. The ship information display device 100 may repeatedly execute the camera image synthesized screen display processing at a given time interval to update the camera image synthesized screen 981 on real time.

Note that the user interface can also be displayed on the meter image synthesized screen 971 and the camera image synthesized screen 981, and when the user taps the user interface, the display can be switched to the synthesized screen 900. Moreover, since the underwater echo image is not displayed in the meter image synthesized screen display processing and the camera image synthesized screen display processing, the second controller 220 may suspend the generation of the underwater echo image or may execute the generation of the underwater echo image in the background.

OTHER EMBODIMENTS

Although in the above embodiment the external output terminal 510 and the external input terminal 520 are connected with each other through the cable 530 and the synthesized screen 900 is generated based on the underwater echo image which is outputted from the external output terminal 510 and inputted from the external input terminal 520, the present disclosure is not limited to this configuration. The graphic processor 300 may generate the synthesized screen 900 not using the underwater echo image inputted from the external input terminal 520 but using the underwater echo image received from the second controller 220. For example, the external output terminal 510 and the external input terminal 520 may not be provided.

Figure 28:
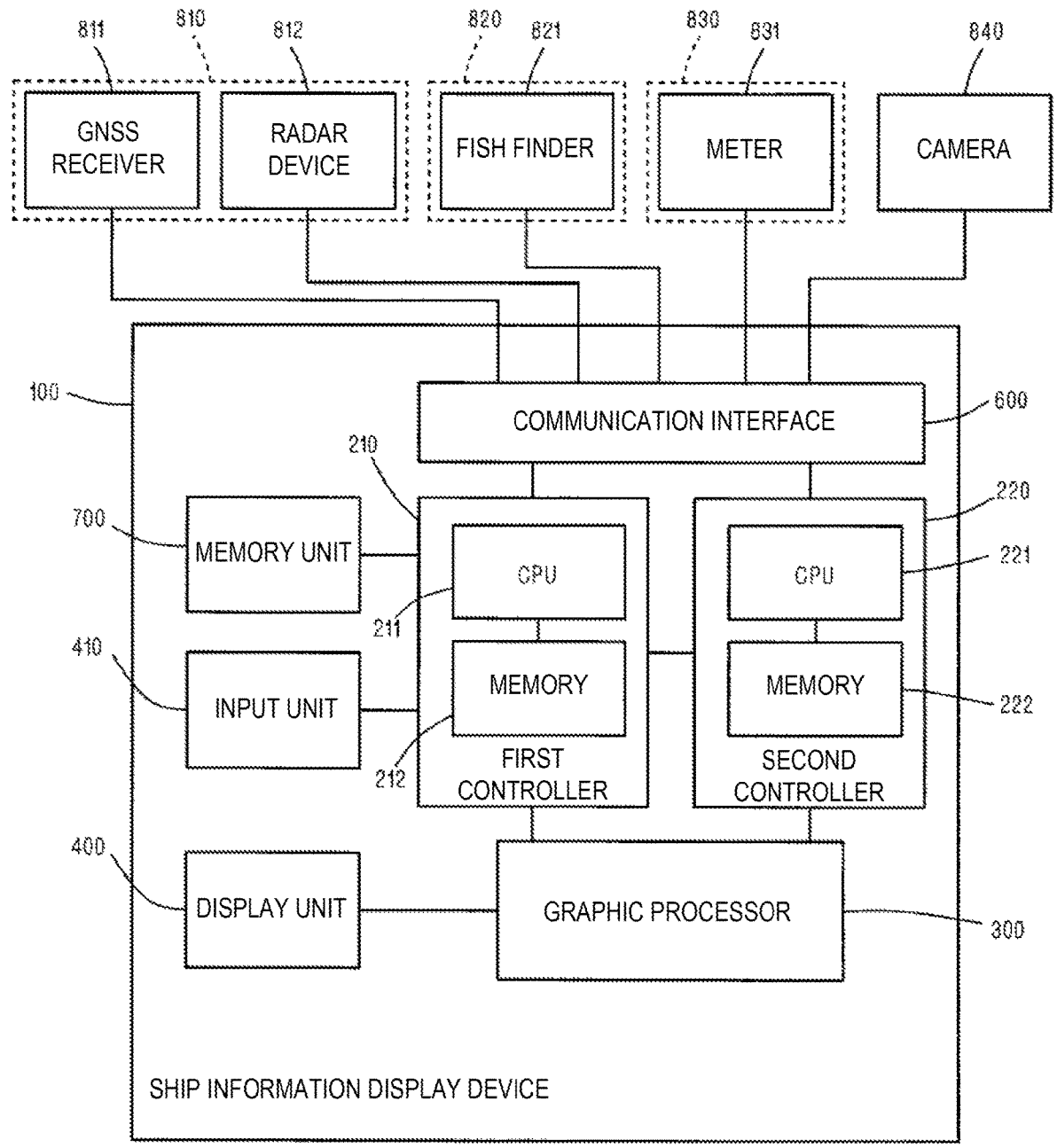
FIG. 28 is a block diagram illustrating a configuration of a first modification of the ship information display device.

FIG. 28 is a block diagram illustrating a configuration of a first modification of the ship information display device. In the first modification, the external output terminal 510 and the external input terminal 520 may not be provided, and the output terminal 310 and the input terminal 320 may not be provided to the graphic processor 300, either. In this first modification, the graphic processor 300 may synthesize the screen to be synthesized received from the first controller 210 with the underwater echo image directly received from the second controller 220 to generate the synthesized screen 900.

Figure 29:
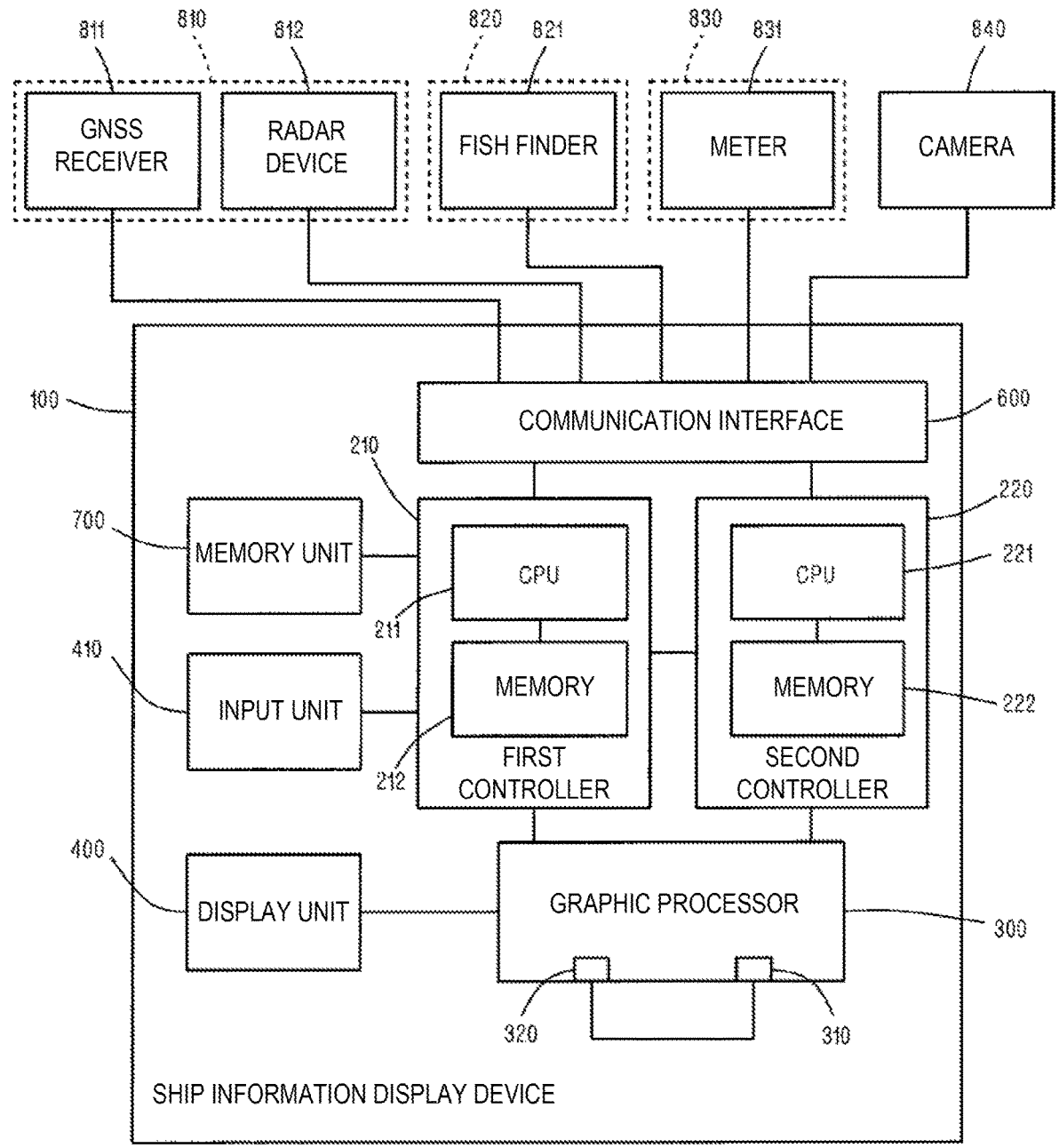
FIG. 29 is a block diagram illustrating a configuration of a second modification of the ship information display device.

Alternatively, the synthesized screen 900 may also be generated using an underwater echo image inputted from other than the external input terminal 520. FIG. 29 is a block diagram illustrating a configuration of a second modification of the ship information display device. In the second modification, the external output terminal 510 and the external input terminal 520 may not be provided, but the output terminal 310 and the input terminal 320 which are provided to the graphic processor 300 may be mutually connected inside the ship information display device. In this second modification, the underwater echo image transmitted from the second controller 220 to the graphic processor 300 may be outputted from the output terminal 310, and may be inputted from the input terminal 320. The graphic processor 300 may synthesize the screen to be synthesized received from the first controller 210 with the underwater echo image inputted from the input terminal 320 to generate the synthesized screen 900.

Figure 30:
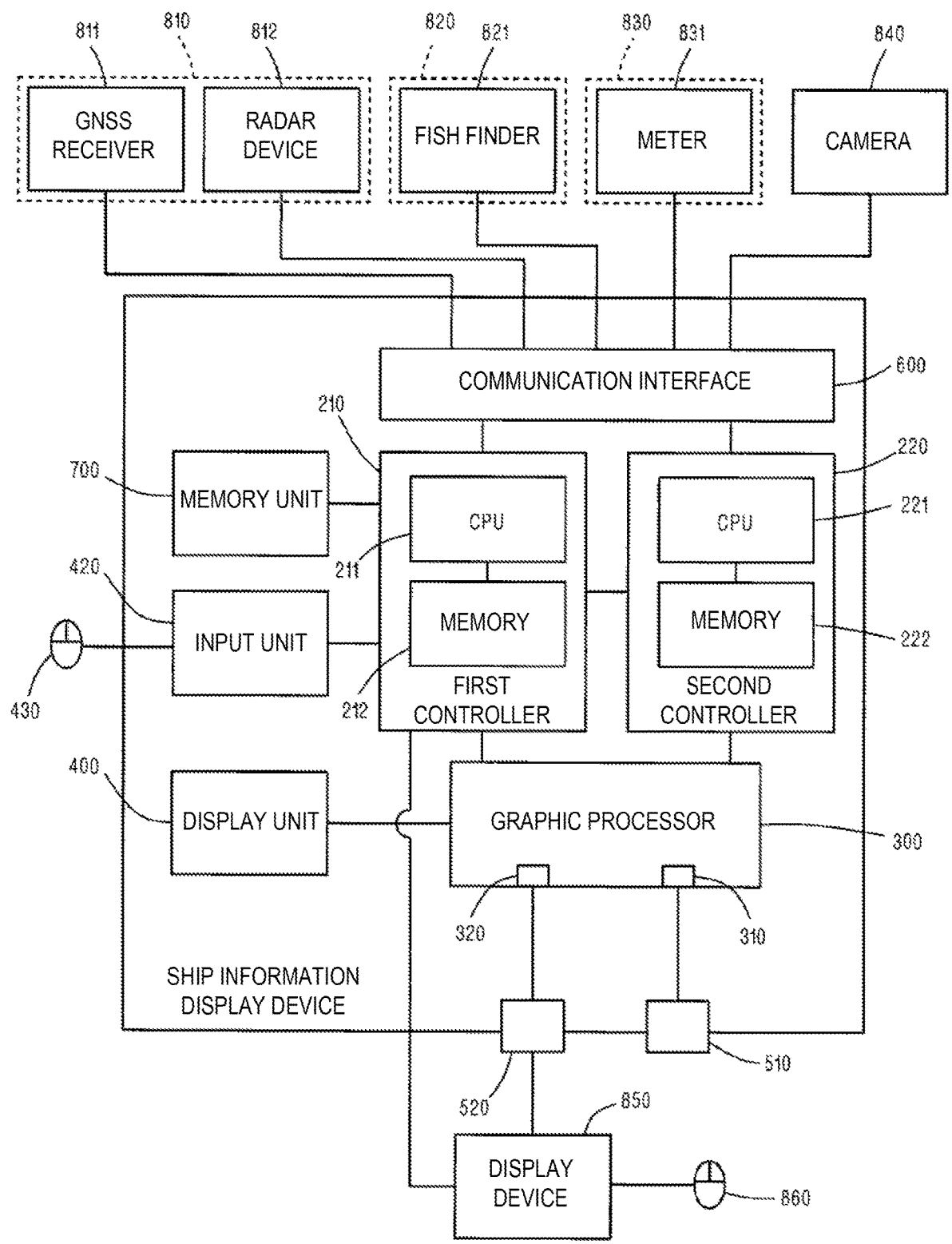
FIG. 30 is a block diagram illustrating a configuration of a third modification of the ship information display device.

Alternatively, the external input terminal 520 may be connected to an external display device instead of the external output terminal 510, and the synthesized screen may be generated using the image displayed in this display device. FIG. 30 is a block diagram illustrating a configuration of a third modification of the ship information display device. In the ship information display device of the third modification, the external display device 850 may be connected to the external input terminal 520, and image data on the display screen of the display device 850 may be inputted into the ship information display device from the external input terminal 520. Moreover, the ship information display device of the third modification may be provided with the input unit 420 which is an input-and-output (I/O) interface, such as a USB, instead of the input unit 410 of the touchpad, and the mouse 430 which is the position input device may be connected to the input unit 420. The mouse 430 may be used for operation to the screen displayed on the display unit 400. Moreover, the external display device 850 may be a computer which can process information, and may be provided with the mouse 860 (other position input devices, such as a touchpad, may also be possible). The display device 850 can generate and display an image by information processing. The mouse 860 may be used for operation to the screen displayed on the display device 850. In this third modification, the image currently displayed on the display device 850 may be inputted from the external input terminal 520, and may be given to the graphic processor 300 through the input terminal 320. The graphic processor 300 may synthesize the screen to be synthesized received from the first controller 210 with the display image of the display device 850 inputted from the input terminal 320 to generate the synthesized screen. The generated synthesized screen may be displayed on the display unit 400. The user can operate the mouse 430 to input coordinate information in the synthesized screen displayed on the display unit 400. The coordinate information inputted to the synthesized screen may be given to the first controller 210 from the input unit 420. The first controller 210 may be connected to the display device 850 through the external bus, and if the coordinate information indicates the position inside the area of the display image on the display device 850 in the synthesized screen, the first controller 210 may perform the coordinate conversion from the coordinate system of the display unit 400 to the coordinate system of the display device 850, and then transmit the converted coordinate information to the display device 850. The display device 850 may execute processing corresponding to the received coordinate information, and reflect the result on the display image. Alternatively, the user may operate the mouse 860 to input the coordinate information in the display image of the display device 850, and when the coordinate information is directly inputted in this way, the display device 850 may also execute the processing corresponding to this information, and then reflect the result on the display image.

Although in the above embodiment the graphic processor 300 generates the first layer from the screen to be synthesized, generates the second layer from the underwater echo image, carries out the transparent processing of the blank image of the first layer, and superimposes the first layer (surface side) on the second layer (background side), to generate the synthesized screen 900, the present disclosure is not limited to this configuration. The synthesized screen 900 may also be generated in the reversed superimposing order, i.e., the first layer is the background side and the second layer is the surface side. In this case, the nautical chart plotter image and the radar image which are the first layer can be displayed by carrying out the transparent processing of the area of the second layer other than the underwater echo image. Alternatively, the synthesized screen 900 may also be generated by rewriting the blank image of the screen to be synthesized by the underwater echo image, without the layering.

Moreover, although in the above embodiment the first ship sensor is comprised of the GNSS receiver 811 and the radar device 812, the second ship sensor is comprised of the fish finder 821, and the third ship sensor is comprised of the meter 831, the present disclosure is not limited to this configuration. Further, the combination of the first ship sensor, the second ship sensor, and the third ship sensor is not limited to the above. For example, the first ship sensor may be comprised of the GNSS receiver 811 and the fish finder 821. The first image including the nautical chart plotter image and the underwater echo image using the first ship information (the positional information of the ship and the echo information) obtained from the first ship sensor may be generated, and the screen to be synthesized including the first image and the blank image may be generated. The second ship sensor may be comprised of the radar device 812. The second image which is the radar image may be generated using the second ship information (the radar information) obtained from the second ship sensor, and the synthesized screen where the blank image of the screen to be synthesized is replaced by the second image may be generated. Alternatively, the first ship sensor, the second ship sensor, and the third ship sensor may also be comprised of other sensors, such as Automatic Identification System (AIS) and a marine facsimile receiver for meteorological charts.

Moreover, although, in the above embodiment the graphic processor 300 which is a single circuit performs the image processing for generating the synthesized screen 900, the present disclosure is not limited to this configuration. The graphic processor may be comprised of a plurality of graphic processing circuits, and the synthesized screen 900 may also be generated by distributed processing with the graphic processing circuits. For example, the graphic processor 300 may be comprised of a circuit which generates the first layer, a circuit which generates the second layer, and a circuit which superimposes the first layer on the second layer or vice versa.

The ship information display device and the method of displaying the ship information of the present disclosure are useful for displaying the ship information, such as the nautical chart, the radar information, the echo information of the fish finder, and the meter information of the ship.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom,"

"top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A ship information display device, comprising:
a nautical chart memory configured to store a nautical chart;
a first processor, coupled to the nautical chart memory, and a first memory storing a first set of instructions that, when executed by the first processor, are configured to:
retrieve the nautical chart from the nautical chart memory;
generate a first image based on first ship information, which is continuously transmitted at a given time interval by a first ship sensor, and the retrieved nautical chart, and
generate a first screen to be synthesized including the first image and a blank image;
a second processor and a second memory storing a second set of instructions that, when executed by the second processor, are configured to generate a second image including a 3D underwater image by shifting and accumulating a 2D echo tomogram, based on second ship information received from a second ship sensor which includes an underwater echo finder and is different from the first ship sensor;
a graphic processor comprising an integrated circuit operatively coupled to the first processor and the second processor and configured to
receive the first image from the first processor and the second image from the second processor;
repeatedly generate a synthesized screen including the first image and the second image by replacing the blank image of the first screen with the second image generated by the second processor at the given time interval; and
a display operatively coupled to the graphic processor and configured to display the synthesized screen, wherein
the first processor and the second processor are each configured with respective graphic processing circuits; and
a load in image generation required for generating the synthesized screen is distributed from the graphic processor to the respective graphic processing circuits of the first processor and the second processor to repeatedly generate the synthesized screen.

2. The ship information display device of claim 1, wherein the graphic processor generates the synthesized screen by overlapping a first layer including the first screen to be synthesized with a second layer including the second image having the same size as the blank image.

3. The ship information display device of claim 2, wherein the graphic processor replaces the blank image by the second image by carrying out transparent processing of the blank image in which the first layer is used as a surface side and the second layer is used as a background side.

4. The ship information display device of claim 3, wherein the first processor sets pixels of the blank image to a given color, and the graphic processor carries out the transparent processing of an area of the first screen to be synthesized in the given color.

5. The ship information display device of claim 1, further comprising an external output terminal configured to output an image signal indicative of the second image.

6. The ship information display device of claim 5, further comprising an external input terminal configured to receive an input of an image signal from the exterior of the ship information display device and give the inputted image signal to the graphic processor,
wherein when the external output terminal and the external input terminal are connected with each other, the graphic processor generates the synthesized screen from the second image obtained from the image signal that is outputted from the external output terminal and received by the external input terminal.

7. The ship information display device of claim 1, further comprising an input unit configured to receive an input from the exterior of the ship information display device,
wherein when the input unit receives an instruction of switching from the second image to a third image different from the first image and the second image, the first processor generates a display screen in which the blank image of the first screen to be synthesized is replaced by the third image, and
wherein the display displays the display screen generated by the first processor.

8. The ship information display device of claim 7, wherein the first processor generates the third image based on third ship information received from a third ship sensor.

9. The ship information display device of claim 7, wherein the third image is an image obtained from a camera installed in the ship.

10. The ship information display device of claim 1, further comprising an input unit configured to receive an input of a position inside a display area of the second image of the synthesized screen displayed on the display,
wherein when the input unit receives the input of the position inside the display area of the second image of the synthesized screen, the second processor executes processing corresponding to coordinates of the position after a coordinate conversion from a coordinate system of the synthesized screen to the coordinate system of the second image.

11. The ship information display device of claim 10, wherein when the input unit receives the input of the position inside the display area of the second image of the synthesized screen, the first processor converts the coordinates of the position from the coordinate system of the synthesized screen into the coordinate system of the second image.

12. The ship information display device of claim 10, wherein when the input unit receives the input of the position inside a display area of the first image of the synthesized screen, the first processor executes processing corresponding to the position.

13. The ship information display device of claim 1, further comprising an input unit configured to receive an input inside a display area of the second image of the synthesized screen displayed on the display,
wherein the synthesized screen includes a user interface inside the display area of the second image, and
wherein when the input unit receives an input to the user interface, the first processor executes processing corresponding to the input.

14. The ship information display device of claim 13, wherein the first processor generates the first screen to be synthesized including the user interface in the blank image, and
wherein the graphic processor generates the synthesized screen in which the blank image is replaced by the second image, and the user interface is displayed in a same location as in the first screen.

15. The ship information display device of claim 14, wherein when the input unit receives the input that instructs a movement of the user interface, the first processor generates the first screen to be synthesized in which a position of the user interface is changed in the blank image.

16. The ship information display device of claim 13, wherein when the input unit receives the input to the user interface, the first processor generates a display screen in which the blank image of the first screen to be synthesized is replaced by a third image different from the first image and the second image, and
wherein the display displays the display screen generated by the first processor.

17. The ship information display device of claim 13, wherein when the input unit receives the input to the user interface, the first processor switches the screen to be synthesized from the first screen to be synthesized to a second screen to be synthesized including the user interface, in which the entire image other than the user interface is the blank image,
wherein the graphic processor generates a second synthesized screen in which the blank image of the second screen to be synthesized generated by the first processor is replaced by the second image, and
wherein the display displays the second synthesized screen generated by the graphic processor.

18. The ship information display device of claim 17, wherein in a case where the second synthesized screen is displayed by the display, when the input unit receives the input to the user interface, the first processor switches the screen to be synthesized from the second screen to be synthesized to the first screen to be synthesized.

19. A method of displaying ship information, comprising the steps of:
retrieving a nautical chart from a nautical chart memory;
generating, via a first processor coupled to the nautical chart memory, a first image based on first ship information, which is continuously transmitted at a given time interval by a first ship sensor, and the retrieved nautical chart, and generating a first screen to be synthesized including the first image and a blank image;
generating, via a second processor, a second image including a 3D underwater image by shifting and accumulating a 2D echo tomogram, based on second ship information received from a second ship sensor which includes an underwater echo finder and is different from the first ship sensor;
generating, via a graphic processor comprising an integrated circuit operatively coupled to the first processor and the second processor, a synthesized screen including the first image and the second image by repeatedly replacing the blank image of the first screen with the second image generated by the second processor at the given time interval; and
displaying the synthesized screen on a display operatively coupled to the graphic processor, wherein
the first processor and the second processor are each configured with respective graphic processing circuits; and
a load in image generation required for generating the synthesized screen is distributed from the graphic processor to the respective graphic processing circuits of the first processor and the second processor to repeatedly generate the synthesized screen.

20. The ship information display device of claim 1, wherein the second processor processes the second ship information to generate the second image in real time.

21. The ship information display device of claim 1, wherein the first ship sensor is installed on a ship and includes a GNSS (Global Navigation Satellite System) receiver; and
wherein the first image includes a nautical chart plotter image, a position, and a route of the ship on the nautical chart plotter image.

22. The ship information display device of claim 1, wherein the first ship sensor is installed on a ship and includes a radar device; and
wherein the first image includes a radar image that displays a distance and a direction from the ship collected by the radar device.

23. The ship information display device of claim 1, wherein the first ship sensor is installed on a ship and includes a meter; and
wherein the first ship information includes at least one of a speed of the ship, an engine speed of the ship, or a temperature.

24. The ship information display device of claim 1, wherein the first ship sensor is installed on a ship and a receiver to receive information on an AIS (automatic identification system).

25. The ship information display device of claim 1, wherein the second ship sensor is installed on a ship and includes a fish finder;
wherein the second ship information includes echo information generated continuously in real time, and a 2D echo image generated from the echo information at one time point; and
wherein the second image includes a 3D underwater echo image drawn by arranging a plurality of the echo tomogram in one row.

26. The ship information display device of claim 1, wherein the second ship sensor is installed on a ship and includes a camera; and
wherein the second image includes a camera image that is repeatedly captured and updated at a given interval by the camera.

27. The ship information display device of claim 1, wherein the graphic processor is further configured to size the second image to a size of the blank image.

* * * * *